(12) United States Patent
Ohkawa

(10) Patent No.: US 8,177,378 B2
(45) Date of Patent: May 15, 2012

(54) LIGHT EMITTING APPARATUS AND IMAGE DISPLAYING APPARATUS

(75) Inventor: Shingo Ohkawa, Saitama (JP)

(73) Assignee: Sony Corporation, Tokyo (JP)

( * ) Notice: Subject to any disclaimer, the term of this patent is extended or adjusted under 35 U.S.C. 154(b) by 308 days.

(21) Appl. No.: 12/688,694

(22) Filed: Jan. 15, 2010

(65) Prior Publication Data

US 2010/0195315 A1 Aug. 5, 2010

(30) Foreign Application Priority Data

Jan. 26, 2009 (JP) ................ P2009-014623

(51) Int. Cl.
*G09F 13/04* (2006.01)
*G02F 1/13357* (2006.01)

(52) U.S. Cl. ............. 362/97.1; 362/97.3; 362/97.2

(58) Field of Classification Search ......... 362/97.1–97.4
See application file for complete search history.

(56) References Cited

U.S. PATENT DOCUMENTS

| | | | |
|---|---|---|---|
| 6,874,900 B2* | 4/2005 | Hsieh | 362/26 |
| 2001/0019380 A1 | 9/2001 | Ishihara | |
| 2007/0058359 A1* | 3/2007 | Saitoh et al. | 362/97 |
| 2007/0171678 A1 | 7/2007 | Shim et al. | |
| 2008/0112156 A1* | 5/2008 | Hsieh et al. | 362/97 |
| 2008/0304265 A1 | 12/2008 | Ohkawa et al. | |
| 2009/0225530 A1* | 9/2009 | Naijo et al. | 362/97.1 |

FOREIGN PATENT DOCUMENTS

JP 2008-305642 12/2008

OTHER PUBLICATIONS

European search report dated Feb. 16, 2011, from the European Patent Office in corresponding European Application No. EP 10250079.0.
Shibanuma, "Light Emitting Device, Surface Light Source, and Image Display Device," Abstract from the European Patent office JP 2008-305642, published Dec. 18, 2008.

* cited by examiner

*Primary Examiner* — David V Bruce

(74) *Attorney, Agent, or Firm* — Finnegan, Henderson, Farabow, Garrett & Dunner, L.L.P.

(57) ABSTRACT

A light emitting apparatus is provided which includes a plurality of light sources for emitting a light, and a light guide plate having a substantially plate shape orthogonal to the optical axis direction of the light source, which includes a light incident face into which a light exited from the light source is incident and a light exit face from which the light incident from the light incident face is exited. Irregularities each made of a first slope forming an angle θa with the plane of the light incident face and a second slope forming an angle θb with the plane of the light incident face are continuously formed on the light incident face.

6 Claims, 27 Drawing Sheets

LIGHT EMITTING APPARATUS AND IMAGE DISPLAYING APPARATUS

BACKGROUND OF THE INVENTION

1. Field of the Invention

The present invention relates to a light emitting apparatus and an image displaying apparatus.

2. Description of the Related Art

In recent years, in many cases, there has been utilized, along with an enlargement of size of a display panel, a backlight-type light emitting apparatus in which a plurality of light emitting diodes (LED) are arranged immediately below the display panel in an image displaying apparatus such as television receiver. The LED has the characteristic of more brightly lighting nearer the center of the LED due to its directivity characteristics. Thus, it is necessary to diffuse lights enough to illuminate the display panel and to reduce a variation in luminance in the display panel.

A method for preventing a variation in luminance from occurring includes a technique described in Japanese Patent Application Laid-Open No. 2008-305642, for example. There is disclosed in Japanese Patent Application Laid-Open No. 2008-305642 a light emitting apparatus capable of restricting a variation in luminance by reflecting a light exited from a LED within a light guide plate multiple times and then reflecting the same on a reflecting mechanism formed within the light guide plate.

SUMMARY OF THE INVENTION

However, there was an issue, in a light emitting apparatus in related art, that a variation in luminance is larger when a position of LED is offset from a normal position. For example, a gap can occur between a LED and a light guide plate due to component-level tolerance, variation in parts' assembly, positional offset in convey, deformation with time and the like. As described above, when the LED is offset from the normal position, a light exited from the LED is irregularly reflected within the light guide plate and then transmits a light exit face of the light guide plate, which causes an issue that a variation in luminance becomes larger.

In light of the foregoing, it is desirable to provide a novel and improved light emitting apparatus and image displaying apparatus capable of preventing a variation in luminance from becoming larger even when a LED is offset from a normal position.

According to an embodiment of the present invention, there is provided a light emitting apparatus including a plurality of light sources for emitting a light, and a light guide plate having a substantially plate shape orthogonal to the optical axis direction of the light source, which includes a light incident face into which a light exited from the light source is incident and a light exit face from which the light incident from the light incident face is exited. Irregularities each made of a first slope forming an angle θa with the plane of the light incident face and a second slope forming an angle θb with the plane of the light incident face are continuously formed on the light incident face, the angle θa is an angle for fully reflecting lights refracted at the first slope and incident into the light guide plate among the lights exited from the light source on the light exit face even when the position of the light source is offset to be distant from the light guide plate, and the angle θb is an angle for preventing the light exited from the light source from being directly refracted at the second slope and incident into the light guide plate even when the position of the light source is offset to be distant from the light guide plate.

With the configuration, the angle θa between the first slope of the irregularity formed on the light incident face of the light emitting apparatus and the plane of the light incident face is configured at the angle at which the lights refracted at the first slope and incident into the light guide plate among the lights exited from the light source are fully reflected on the light exit face even when the position of the light source is offset in a direction further from the light guide plate. Further, the angle θb between the second slope of the irregularity formed on the light incident face of the light emitting apparatus and the plane of the light incident face is configured at the angle at which the lights exited from the light source is prevented from being directly refracted at the second slope and being incident into the light guide plate even when the position of the light source is offset in a direction further from the light guide plate.

The angles θa and θb can be assumed as the angles determined in the following equations (1) and (2) based on an angle θ1 between a line connecting the center of the light source and the first slope or the second slope and an optical axis direction of the light source, an angle θc between the light exit face of the light guide plate and the plane of the light guide plate, and a refractive index n of the light guide plate.

[Formula 1]

$$\theta_a \geq \tan^{-1}\left[\frac{n \cdot \sin\left\{\sin^{-1}\left(\frac{1}{n}\right) - \theta_c\right\} - \sin\theta_1}{n \cdot \cos\left\{\sin^{-1}\left(\frac{1}{n}\right) - \theta_c\right\} - \cos\theta_1}\right] \quad \text{Equation (1)}$$

$$\theta_b \geq \frac{\pi}{2} - \theta_1 \quad \text{Equation (2)}$$

Further, the angle θb is an angle for reducing the absolute amount of lights refracted at the first slope and incident into the light guide plate and then fully reflected on the second slope even when the position of the light source is offset in a direction further from the light guide plate, and can be assumed as the angle determined by the following equation (3).

[Formula 2]

$$\theta_b \leq \frac{\pi - \left[\theta_a + \sin^{-1}\left\{\frac{\sin(\theta_1 - \theta_a)}{n}\right\}\right] - \left\{\sin^{-1}\left(\frac{\sin\theta_c}{n}\right) - \theta_c\right\}}{2} \quad \text{Equation (3)}$$

The light incident face of the light guide plate is provided with a concave into which the light exited from the light source is refracted at the light guide plate and then incident when the position of the light source is not offset, and the irregularities can be continuously formed on an outer peripheral face of the concave.

The first slope and the second slope may be a curved face having a predetermined curvature.

According to another embodiment of the present invention, there is provided an image displaying apparatus including a display panel for displaying an image thereon, and a light emitting apparatus for illuminating the display panel from its back face. The light emitting apparatus includes a plurality of light sources for emitting a light, and a light guide plate having a substantially plate shape substantially orthogonal to the display panel, which includes a light incident face into which a light exited from the light source is incident and a light exit face from which the light incident from the light incident face is exited. Irregularities each made of a first slope forming an angle θa with the plane of the light incident face and a second slope forming an angle θb with the plane of the light incident face are continuously formed on the light incident face, the angle θa is an angle for fully reflecting lights refracted at the first slope and incident into the light guide plate among the lights exited from the light source on the light exit face even when the position of the light source is offset to be distant from the light guide plate, and the angle θb is an angle for preventing the light exited from the light source from being directly refracted at the second slope and incident into the light guide plate even when the position of the light source is offset to be distant from the light guide plate.

According to the present invention described above, it is possible to prevent a variation in luminance from becoming larger even when a LED is offset from a normal position.

DETAILED DESCRIPTION OF THE EMBODIMENTS

Figure 1:
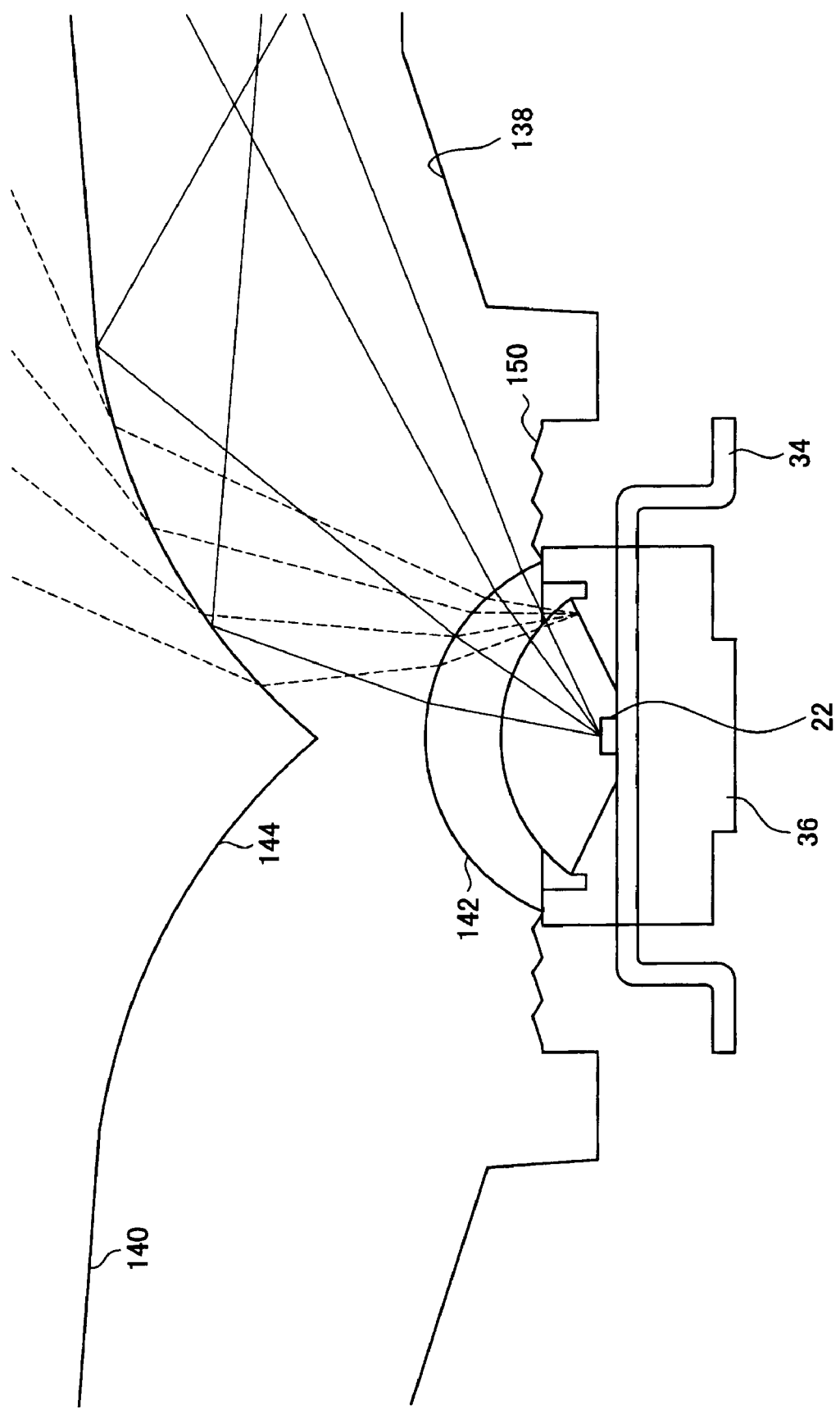
FIG. 1 is an explanatory diagram showing a schematic configuration of a light emitting apparatus 100 according to one embodiment of the present invention.

Hereinafter, preferred embodiments of the present invention will be described in detail with reference to the appended drawings. Note that, in this specification and the appended drawings, structural elements that have substantially the same function and configuration are denoted with the same reference numerals, and repeated explanation of these structural elements is omitted.

The explanation will be made in the following order.
1. Issues in the past
  1-1. Schematic configuration of typical image displaying apparatus 10
  1-2. Issues due to positional offset of LED 22 in light emitting apparatus
2. Schematic configuration of light emitting apparatus 100 according to one embodiment of the present invention
3. Solution of issues due to positional offset of LED 22 in light emitting apparatus 100
4. Simulation results
5. Conclusions <1. Issues in the Past>

A light emitting apparatus 100 according to one embodiment of the present invention will be described in detail after explaining a basic configuration of a light emitting apparatus 16 used for a typical image displaying apparatus 10 and explicitly demonstrating the issues in the past.

[1-1. Schematic Configuration of Typical Image Displaying Apparatus 10]

Figure 17:
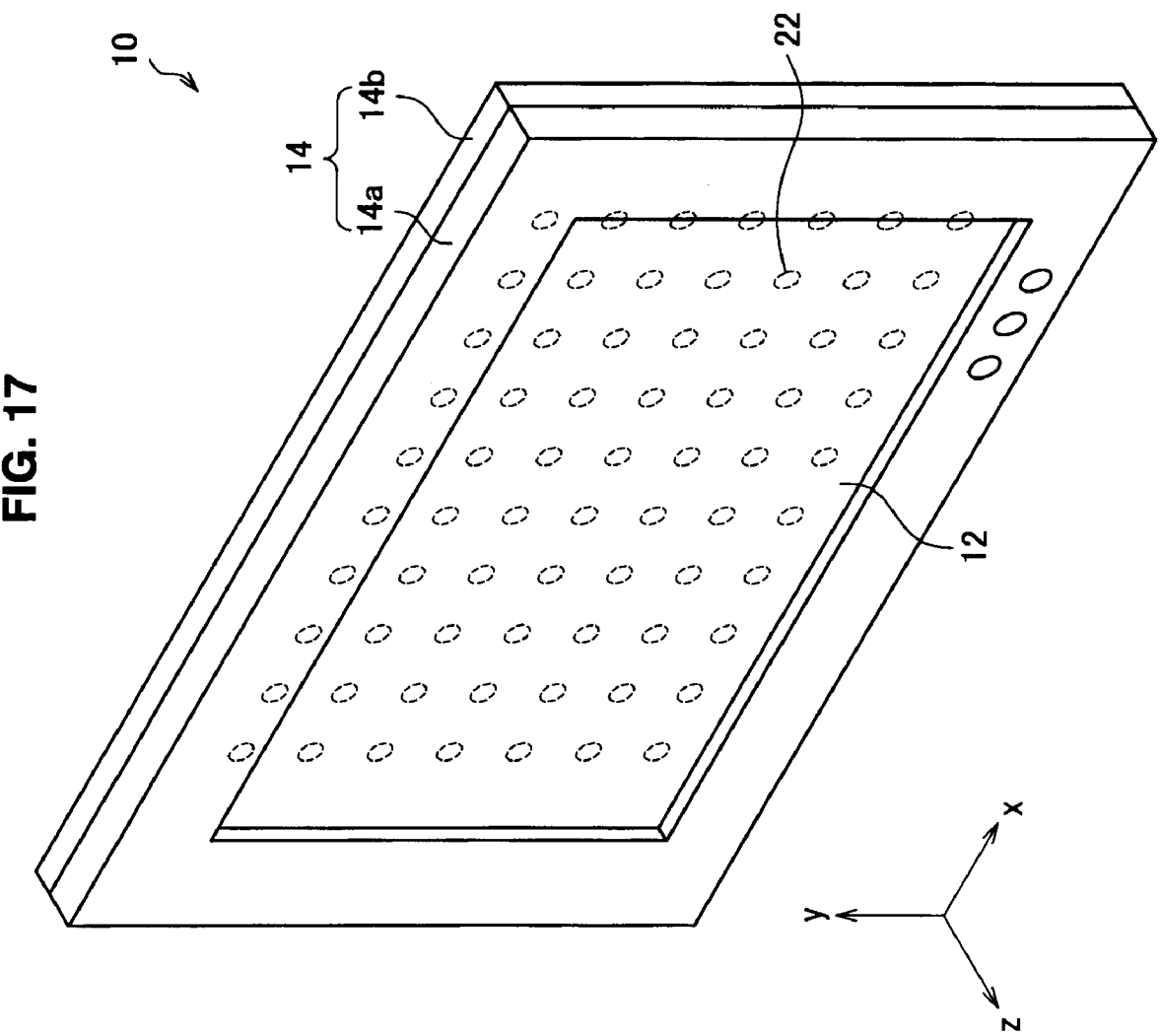
FIG. 17 is a schematic perspective view of a typical image displaying apparatus 10.
Figure 18:
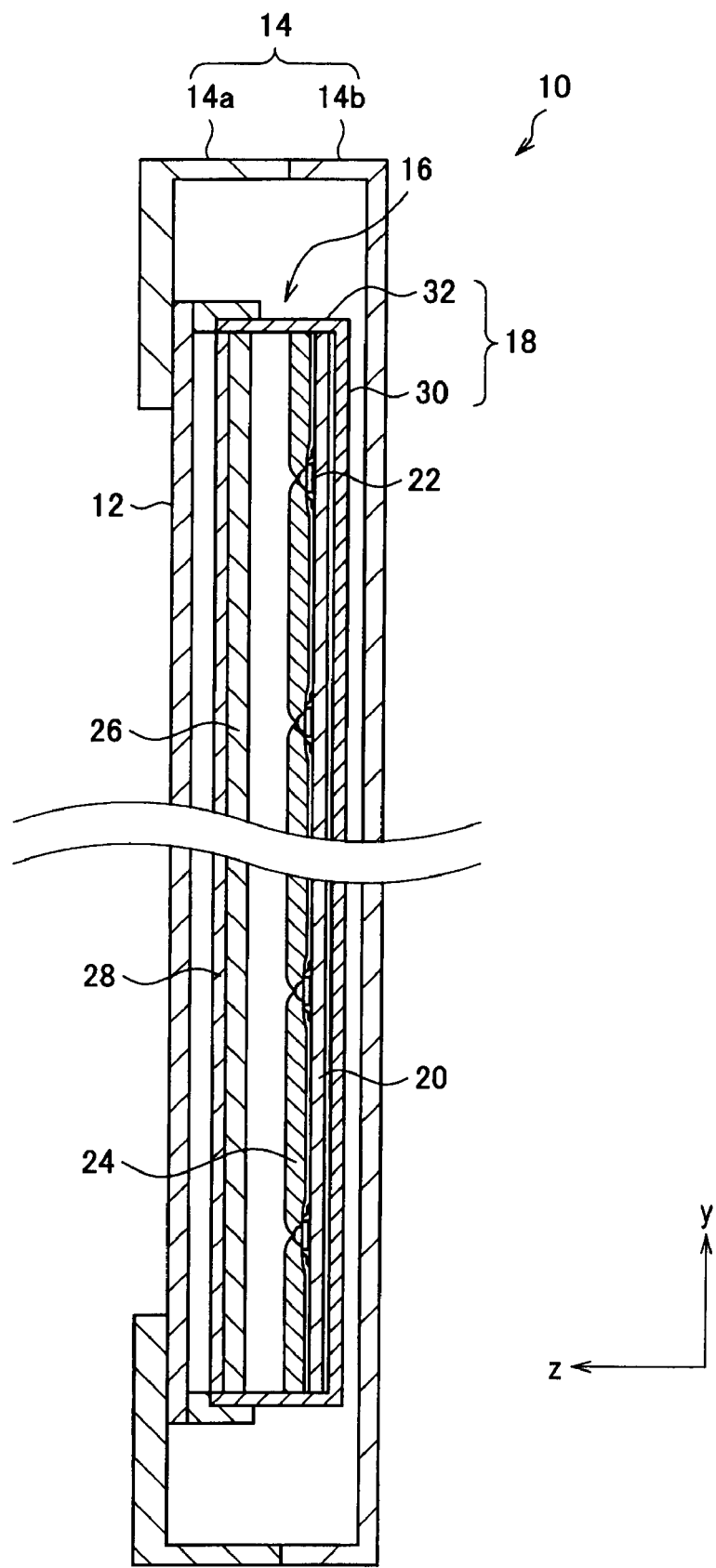
FIG. 18 is a cross section view taken along the line A-A of the image displaying apparatus 10 shown in FIG. 17.
Figure 19:
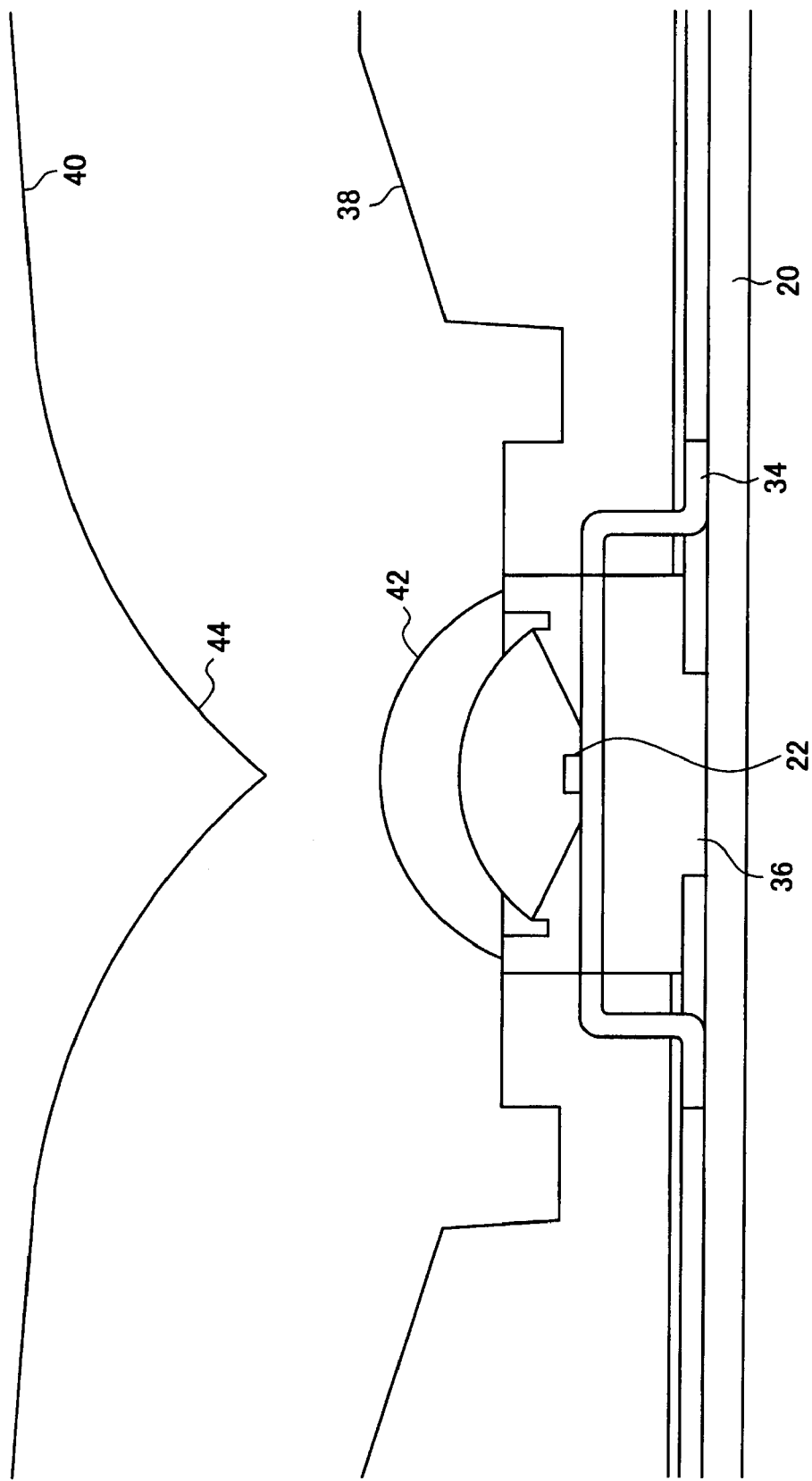
FIG. 19 is an enlarged diagram of a part around the LED 22 of FIG. 18.

FIG. 17 is a schematic perspective diagram showing the typical image displaying apparatus 10. FIG. 18 is a cross section view of the image displaying apparatus 10 shown in FIG. 17. FIG. 19 is an enlarged diagram of a part around a LED 22 of FIG. 18. As shown in FIGS. 17 to 19, the image displaying apparatus 10 includes a display panel 12, an outer casing 14 and a light emitting apparatus 16.

The outer casing 14 is a member for supporting the display panel 12 and housing the light emitting apparatus 16, which is formed by joining a front panel 14a and a rear panel 14b. The front panel 14a is formed with an opening penetrating in the z-axis direction and is provided with the display panel 12 to cover the opening.

The display panel 12 is a panel on which a video is displayed. The display panel 12 sandwiches a transmissive color liquid crystal panel between two polarization plates back and forth and drives the same in an active matrix manner, for example, thereby displaying a full-color video.

As shown in FIG. 18, the outer casing 14 is provided therein with the light emitting apparatus (backlight unit) 16 for illuminating the display panel 12 from the back side (face in the z-axis negative direction in FIG. 17). The light emitting apparatus 16 is a light emitting apparatus of backside downright type in which the LEDs 22 as multiple light sources are arranged on the back face of the display panel 12. The light emitting apparatus 16 includes a casing 18, a circuit board 20, LEDs 22, a light guide plate 24, a diffusion plate 26 and an optical sheet 28.

The casing 18 is made of, for example, a metal material or the like having a high thermal conductivity, houses the circuit board 20, the LEDs 22 and the light guide plate 24 and supports the diffusion plate 26 and the optical sheet 28. The casing 18 includes a flat part 30 opposite to the display panel 12, and a peripheral face 32 projecting substantially vertical to the flat part 30 from the periphery of the flat part 30. The flat part 30 surrounded by the peripheral face 32 houses the circuit board 20, the LEDs 22, the light guide plate 24 and the like. The inner face of the peripheral face 32 contacts the peripheries of the diffusion plate 26 and the optical sheet 28 to support the diffusion plate 26 and the optical sheet 28.

The circuit board 20 is arranged in opposite to the display panel 12 inside the casing 18 and mounts thereon a light emitting control circuit (not shown) for controlling the light emitting of the LEDs 22. A plurality of LEDs 22 are arranged on the circuit board 20 in a matrix manner at a predetermined interval vertically and horizontally (in the x-axis direction and the y-axis direction).

The LED 22 is a light source for emitting a white light, for example. The light exited from the LED 22 is not limited to a white light and may be red, blue or green, for example. For example, a LED 22 for emitting a red light, a LED 22 for emitting a blue light and two LEDs for emitting a green light, which are configured as a set of light emitting units, may be arranged in a matrix manner in multiple sets, and the number of LEDs 22 and the color of light to be emitted are not limited to specific ones.

The LED 22 is connected with a connection terminal 34 and part of the connection terminal 34 is projected from a sealing resin 36 to be connected to the circuit board 20 as shown in FIG. 19. The shape and position of the connection terminal 34 or the sealing resin 36 are appropriately changed depending on a product specification or the like, and is not limited to those shown in FIG. 18.

The light guide plate 24 is formed substantially in a plate shape made of a transparent resin material such as acryl or polycarbonate. The light guide plate 24 has a light incident face 38 (the back face of the light guide plate 24) into which a light exited from the LED 22 is mainly incident, and a light exit face 40 (the front face of the light guide plate 24) from which the light incident into the light guide plate 24 is exited. In other words, the light exited from the LED 22 is incident into the light guide plate 24 from the light incident face 38 and then reflected directly or inside the light guide plate 24 to be exited from the light exit face 40.

A first concave 42 is provided at a position opposing the LED 22 at the light incident face 38 of the light guide plate 24 such that the light exited from the LED 22 can be uniformly diffused inside the light guide plate 24. Further, the light exit face 40 of the light guide plate 24 is provided with a second concave 44 at a position opposing the first concave 42 at the light incident face 38.

The diffusion plate 26 is arranged in opposite to the LED 22, and has a function of diffusing a light exited from the LED 22 inside the outer casing 14 and reducing a variation in luminance in the display panel 12.

The optical sheet 28 is attached to the front face of the diffusion plate 26 and is configured so that various sheets having a predetermined optical function such as a prism sheet for refracting and guiding a light exited from the LED 22 in a predetermined direction or a polarization direction switching sheet for switching a polarization direction are arranged in a stack manner.

Figure 20:
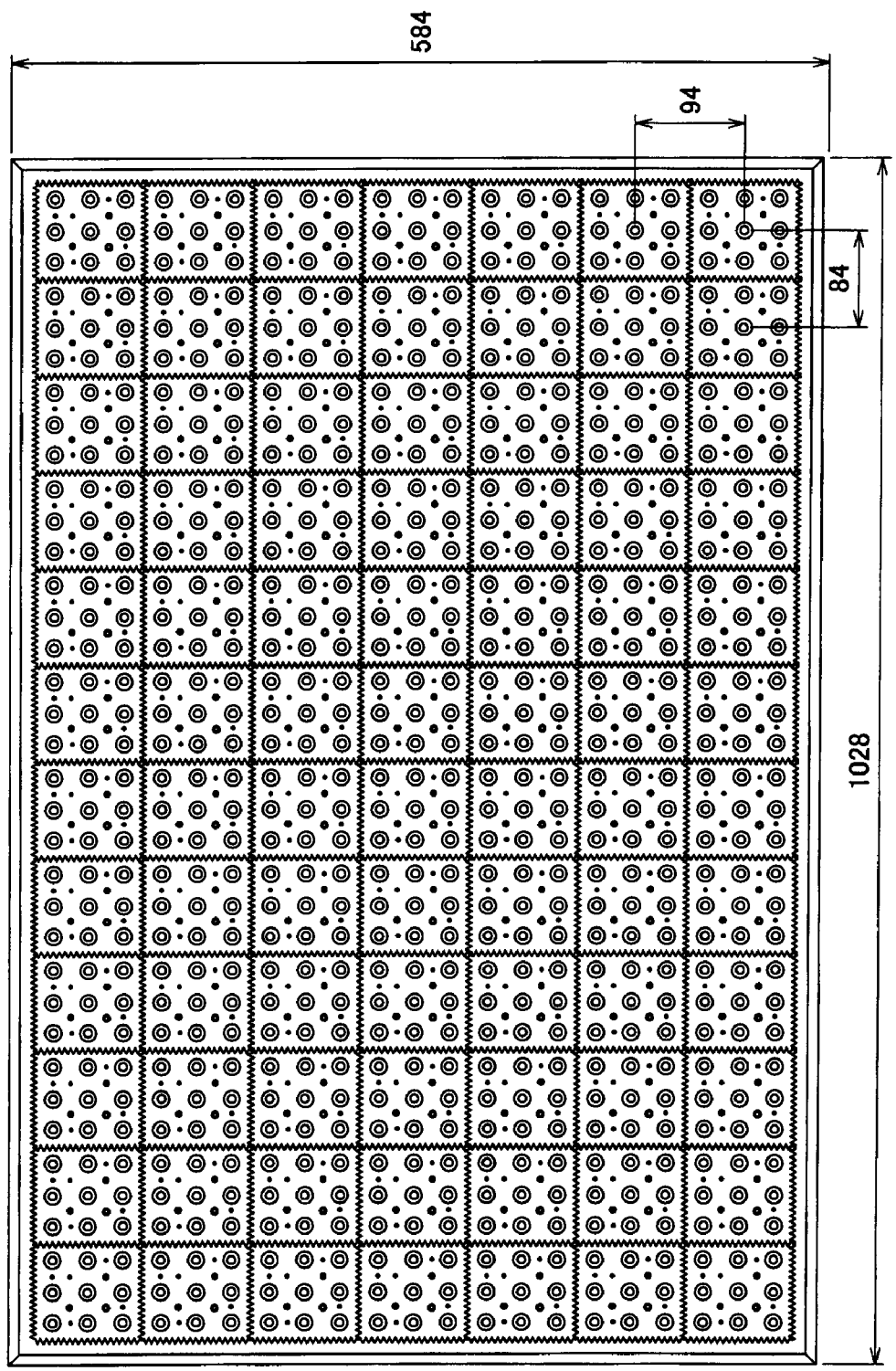
FIG. 20 is a schematic plan view of the inside of a light emitting apparatus 16 shown in FIG. 17.
Figure 21:
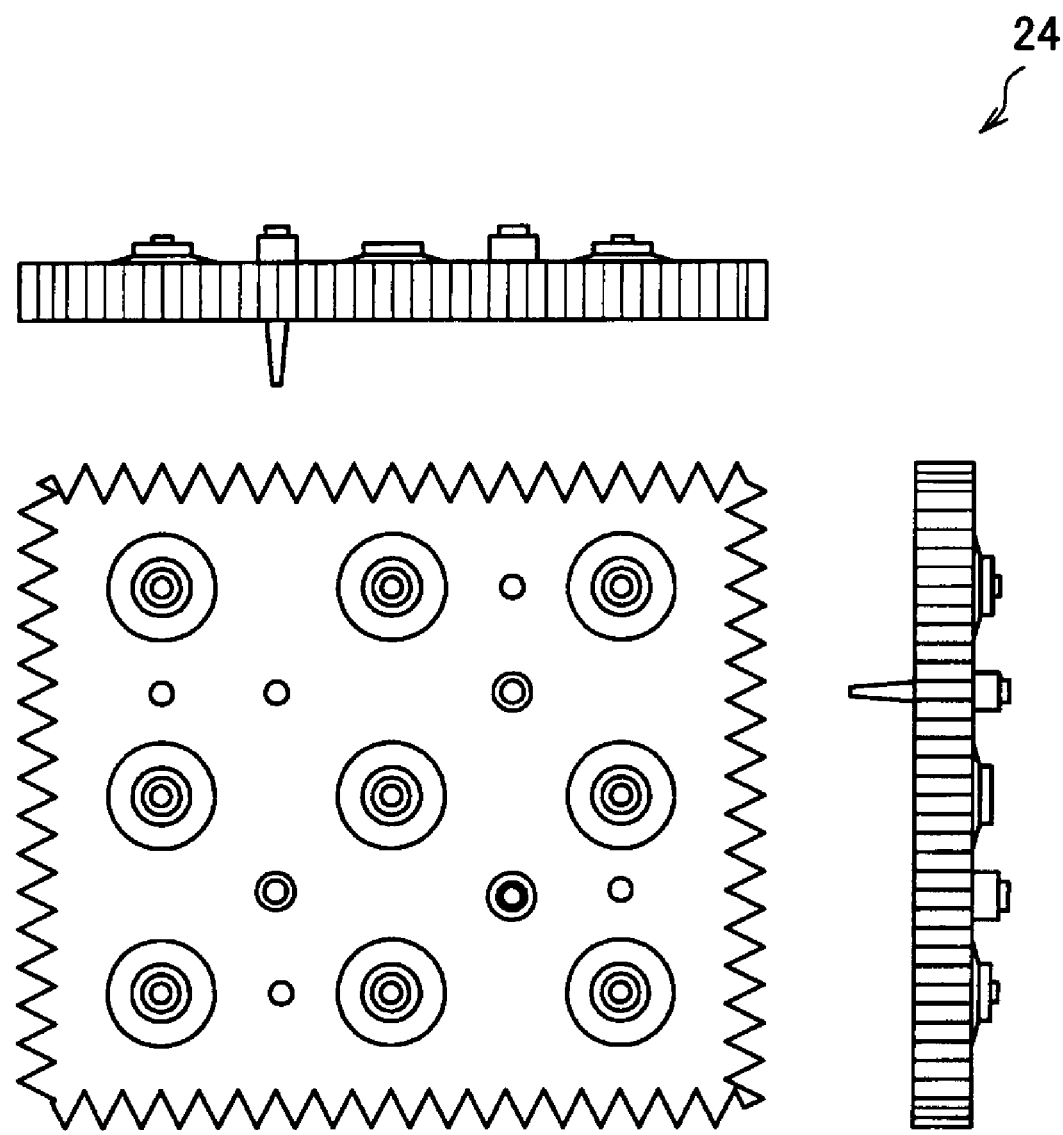
FIG. 21 is a three-directional diagram schematically showing part of a light guide plate 24.

The image displaying apparatus 10 can display a predetermined video on the display panel 12 with the above configuration. The image displaying apparatus 10 is appropriately changed in its configuration depending on a requested specification or the like. For example, FIGS. 20 and 21 show one example of the specification of the image displaying apparatus 10, where FIG. 20 is a schematic plan view of the inside of the light emitting apparatus 16, and FIG. 21 is a three-directional diagram schematically showing one light guide plate 24 housed in the light emitting apparatus 16. The light guide plate 24 in the light emitting apparatus 16 is configured in the dimension shown in FIG. 20, thereby realizing the image display utilizing the 46-inch display panel 12, for example. Of course, the examples shown in FIGS. 20 and 21 are one example of the light emitting apparatus 16, and the dimension, shape, configuration and the like of the light emitting apparatus 16 are not limited thereto.

Figure 22:
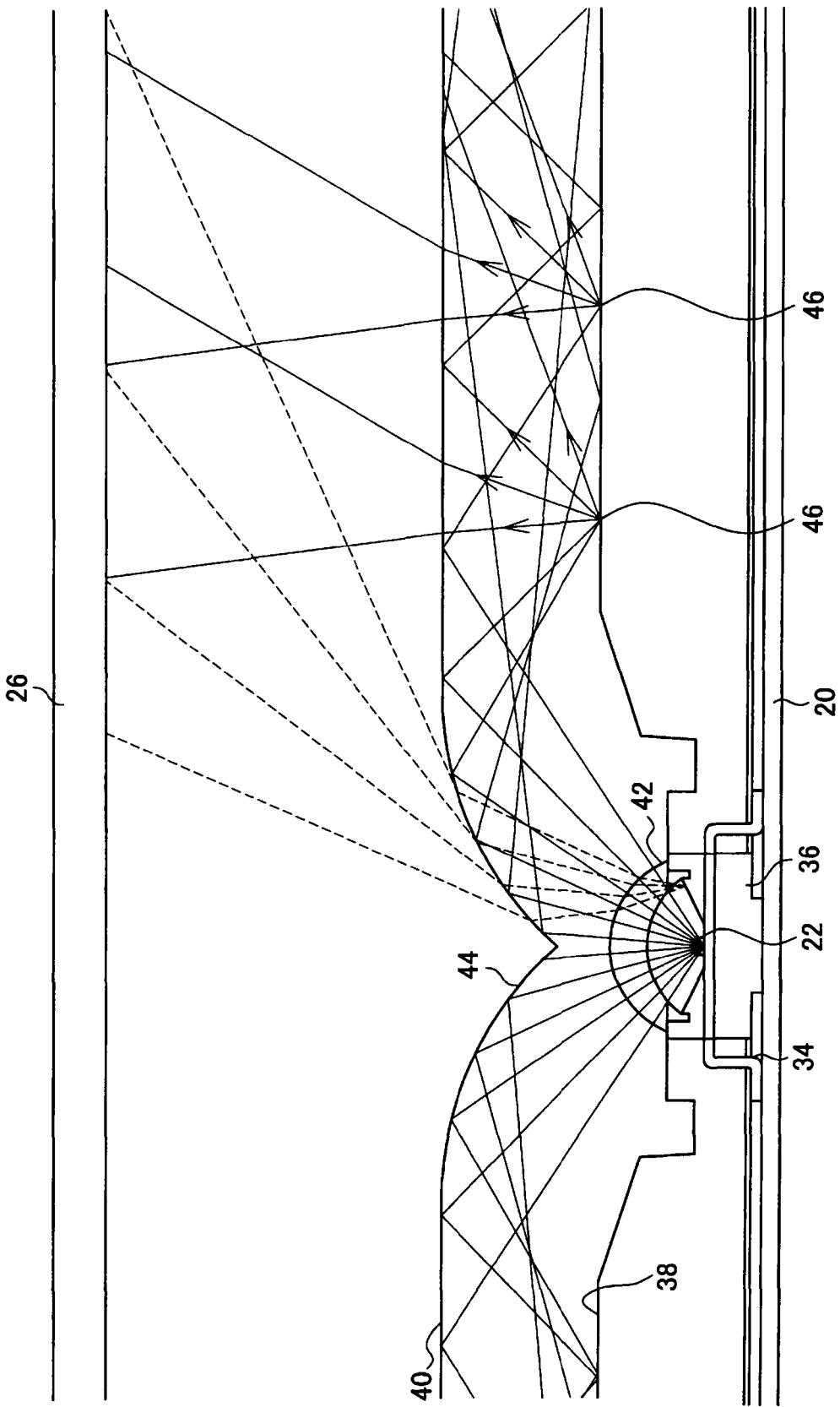
FIG. 22 is an explanatory diagram showing an example of travelling paths of lights exited from one LED 22 configuring the light emitting apparatus 16 in the typical image displaying apparatus 10.

FIG. 22 is an explanatory diagram showing exemplary travelling paths of lights exited from one LED 22 configuring the light emitting apparatus 16. In the example shown in FIG. 22, the lights exited from the center of the LED 22 are indicated in a solid line and exemplary lights exited from a position distant from the center of the LED 22 are indicated in a broken line. Of course, the travelling paths of the lights indicated in the broken line are not limited to the examples shown in FIG. 22.

As shown in FIG. 22, the light exited from the LED 22 is refracted at the first concave 42 of the light incident face 38 when being incident into the light guide plate 24 from the light incident face 38. The light incident into the light guide plate 24 then reaches the light exit face 40. At this time, only the lights reaching the light exit face 40 at a predetermined angle transmit the light exit face 40 and other lights are fully reflected on the light exit face 40 toward the light incident face 38 again.

As shown in FIG. 22, the light incident face 38 of the light guide plate 24 includes convex-shaped reflecting mechanisms 46 at a predetermined interval. The lights fully reflected on the light exit face 40 of the light guide plate 24 are then reflected on the reflection mechanisms at a predetermined angle toward the light exit face 40 again and some lights thereof transmit the light exit face 40 to be exited from the light guide plate 24. In this manner, the light incident face 38 is provided with the reflecting mechanisms 46 so that the travelling path of the light repeatedly reflected inside the light guide plate 24 can be refracted at an arbitrary angle and the light can be exited from the light guide plate 24 without any variation even at a position distant from the LED 22. For example, the number or interval of the reflecting mechanisms 46 are adjusted, thereby further restricting a variation of the lights exited from the light guide plate 24.

[1-2. Issues Due to Positional Offset of LED 22 in Light Emitting Apparatus 16]

As shown in FIG. 22, the light exited from the LED 22 is reflected on the light guide plate 24 multiple times and then exited from the light guide plate 24 in a variation-restricted state if at all possible. However, it is assumed that the LED 22 in the light emitting apparatus 16 is offset from a normal position due to various causes. For example, a gap can occur between the LED 22 and the light guide plate 24 due to component-level tolerance of the LED 22, variation in parts' assembly, positional offset in convey, deformation with time and the like, for example. As described above, when the LED 22 is offset from the normal position, the light exited from the LED 22 is irregularly reflected inside the light guide plate 24 and then transmits the light exit face 40 of the light guide plate 24, which causes an issue that a variation in luminance becomes larger.

Figure 23:
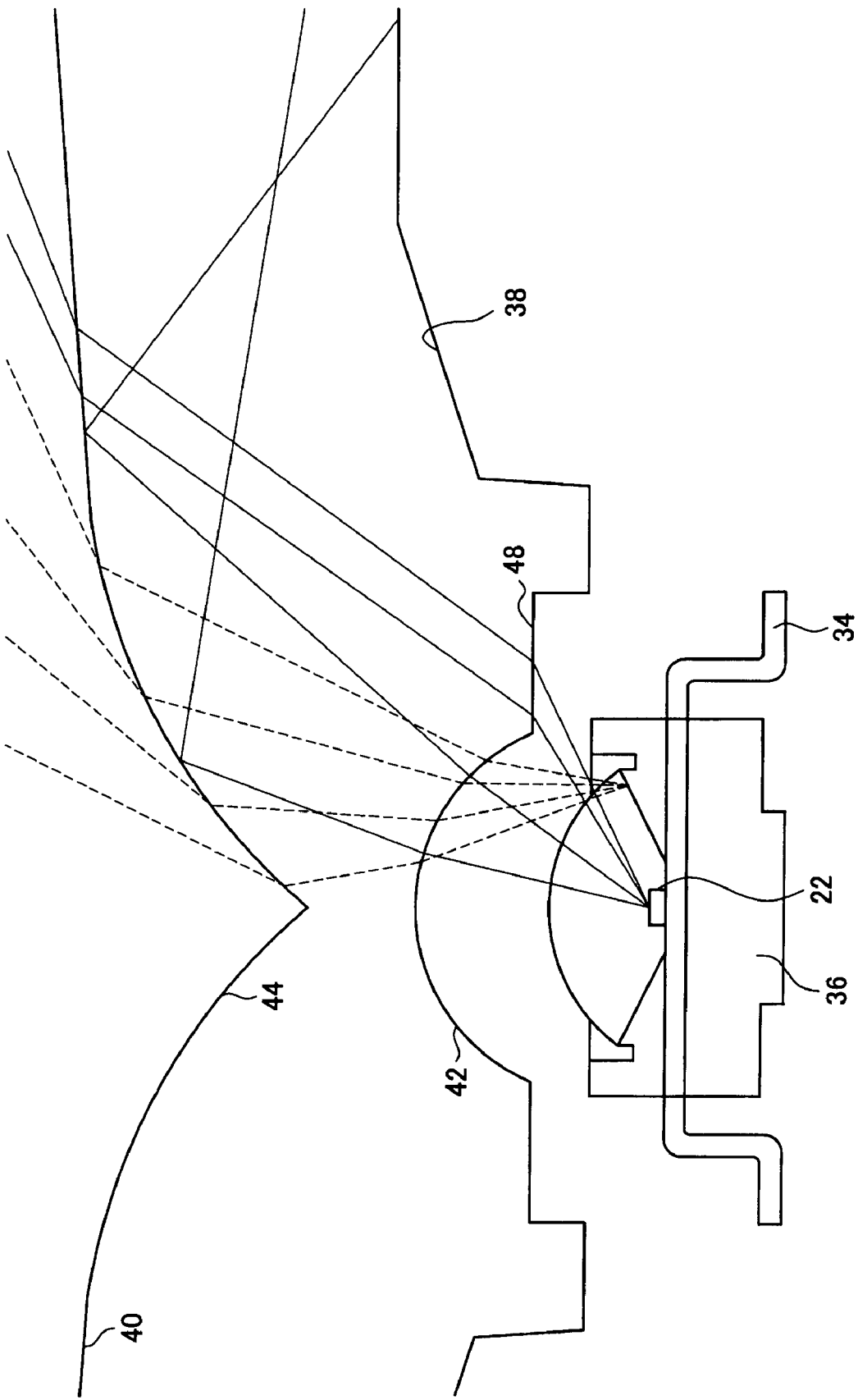
FIG. 23 is an explanatory diagram showing travelling paths of lights exited from the center of the LED 22 when the position of the LED 22 is backward offset from the normal position in the typical image displaying apparatus 10.

FIG. 23 is an explanatory diagram showing travelling paths of lights exited from the center of the LED 22 when the position of the LED 22 is backward offset from the normal position for explaining the above issues. As shown in FIG. 23, some lights exited from the center of the LED 22 are refracted at a flat part 48 formed around the first concave 42 of the light incident face 38 and then incident into the light guide plate 24. The light refracted at the flat part 48 reaches the light exit face 40 of the light guide plate 24 at a different angle from the original angle. Thus, abnormal light emission occurs so that the light transmits the light guide plate 24 without being fully reflected on the light exit face 40, and thus a variation in luminance becomes larger.

Figure 24:
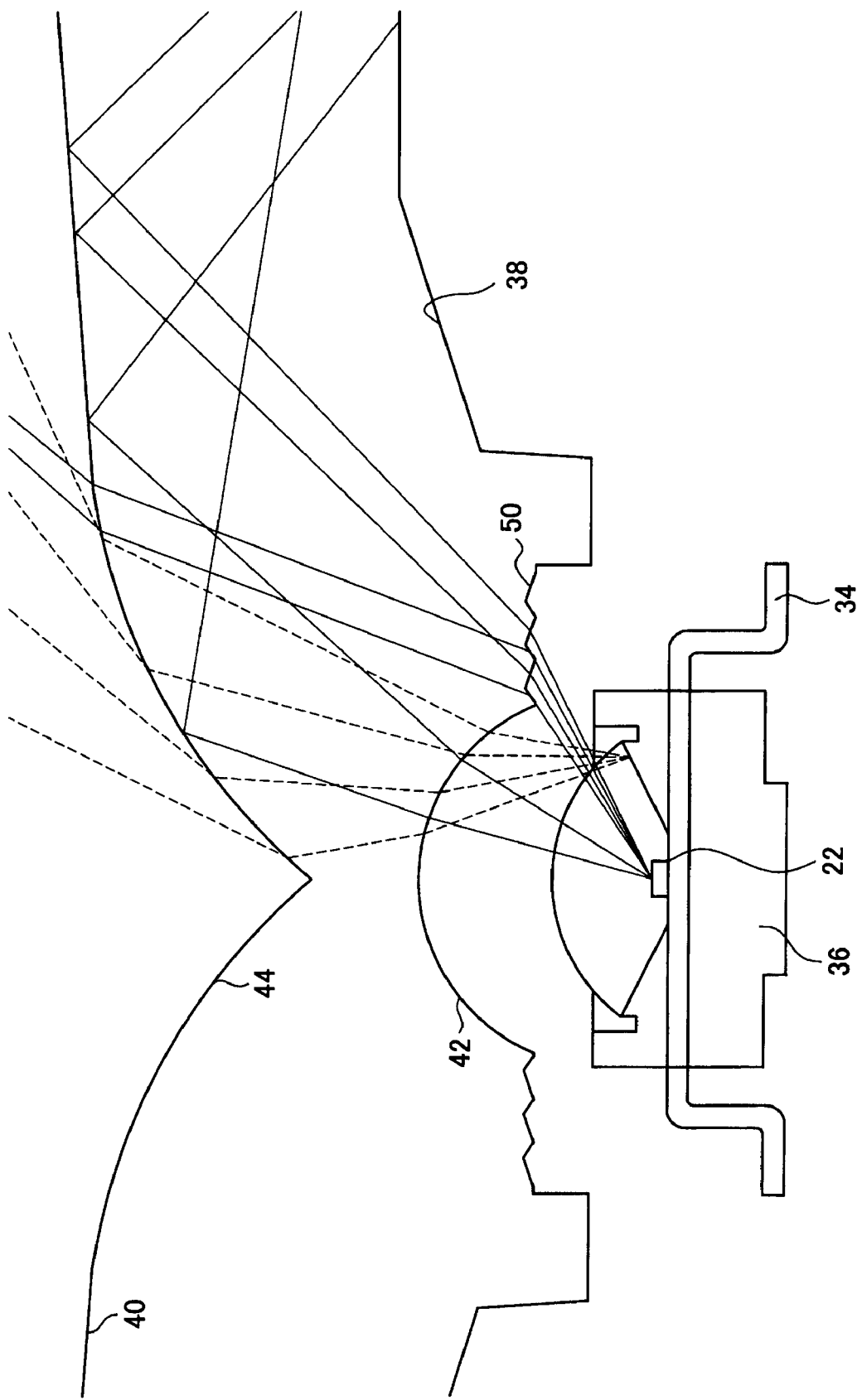
FIG. 24 is an explanatory diagram showing travelling paths of lights exited from the center of the LED 22 when the position of the LED 22 is backward offset from the normal position in the typical image displaying apparatus 10.
Figure 25:
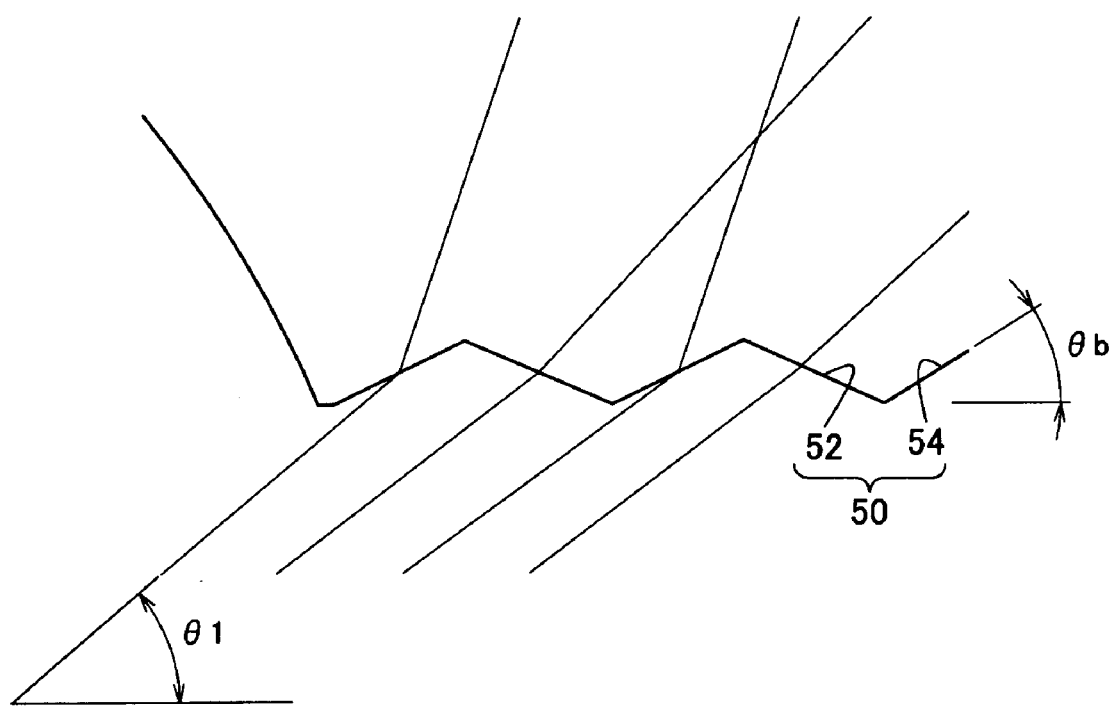
FIG. 25 is an enlarged diagram of a part around irregularities 50 of FIG. 24.

Irregularities 50 having a so-called Fresnel lens shape may be provided around the first concave 42 instead of the flat part 48 in order to adjust the light incident angle into the light guide plate 24 when a light is incident into the light guide plate 24. FIG. 24 is an explanatory diagram showing travelling paths of lights exited from the center of the LED 22 when the position of the LED 22 is backward offset from the normal position in the light emitting apparatus 16 including the light guide plate 24 with the above irregularities 50. FIG. 25 is an enlarged diagram of a part around the irregularities 50 shown in FIG. 24. As shown in FIG. 25, the first slope 52 and the second slope 54 are continuously formed around the first concave 42 of the light incident face 38 so that the irregularities 50 having a concave/convex shape are formed.

Originally, the irregularity 50 having a Fresnel lens shape is provided so that the light exited from the LED 22 is refracted at the first slope 52 at a predetermined angle and then incident into the light guide plate 24. Thus, the light incident into the light guide plate 24 is reflected inside the light guide plate 24 multiple times, thereby reducing a variation in luminance. However, if the position of the LED 22 is backward offset from the normal position, the variation in luminance becomes larger due to abnormal light emission like when the flat part 48 is provided.

For example, as shown in FIG. 25, when the tilt angle θb of the second slope 54 is smaller than the angle θ1 at which the light exited from the center of the LED 22 travels toward the light incident face 38, some lights exited from the center of the LED 22 are refracted at the second slope 54 and then incident into the light guide plate 24. In this manner, the lights refracted at the second slope 54 and then incident into the light guide plate 24 transmit the light guide plate 24 without being fully reflected on the light exit face 40 as shown in FIG. 24, which causes a variation in luminance due to abnormal light emission.

Figure 26:
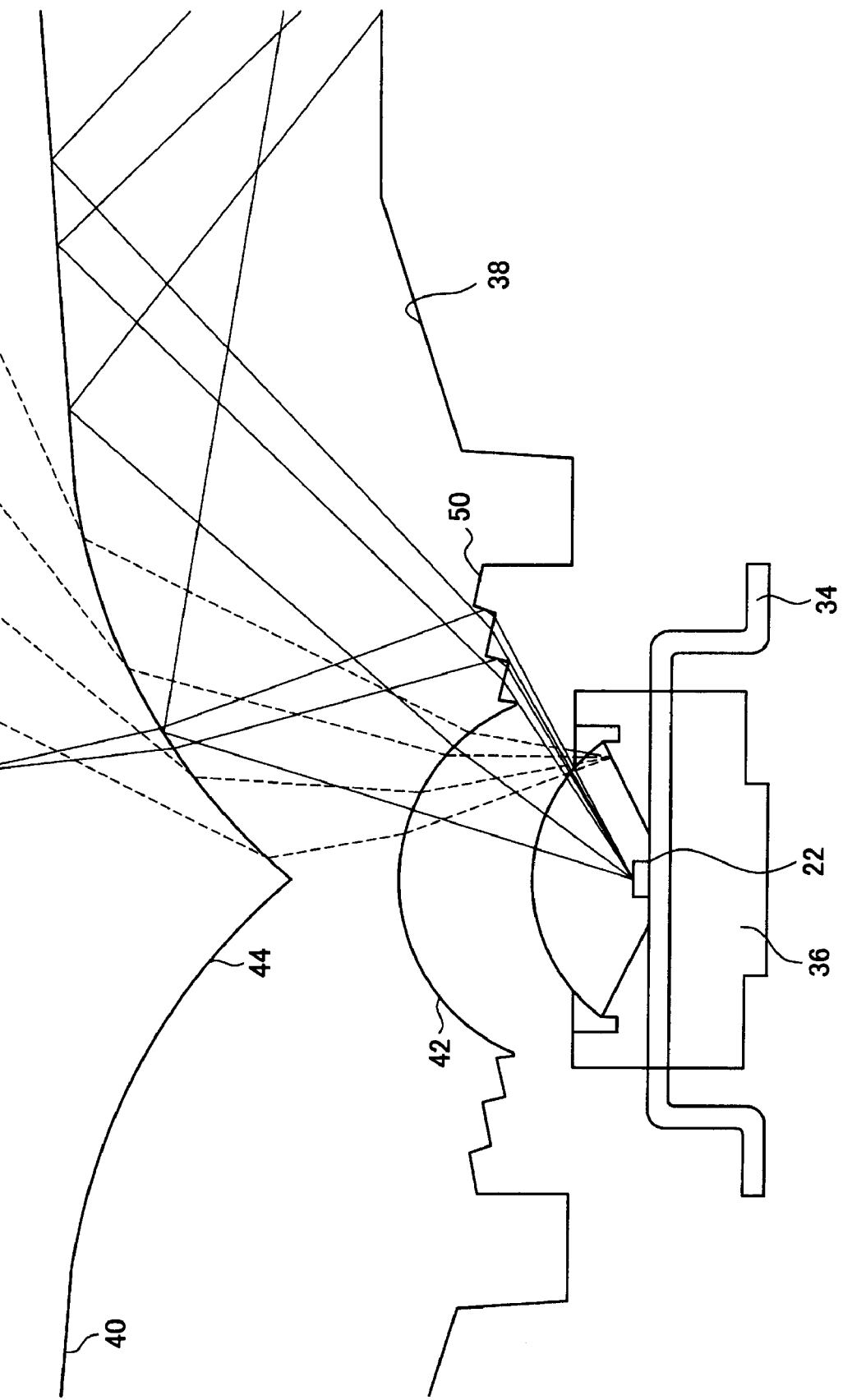
FIG. 26 is an explanatory diagram showing travelling paths of lights exited from the center of the LED 22 when the position of the LED 22 is backward offset from the normal position in the typical image displaying apparatus 10.
Figure 27:
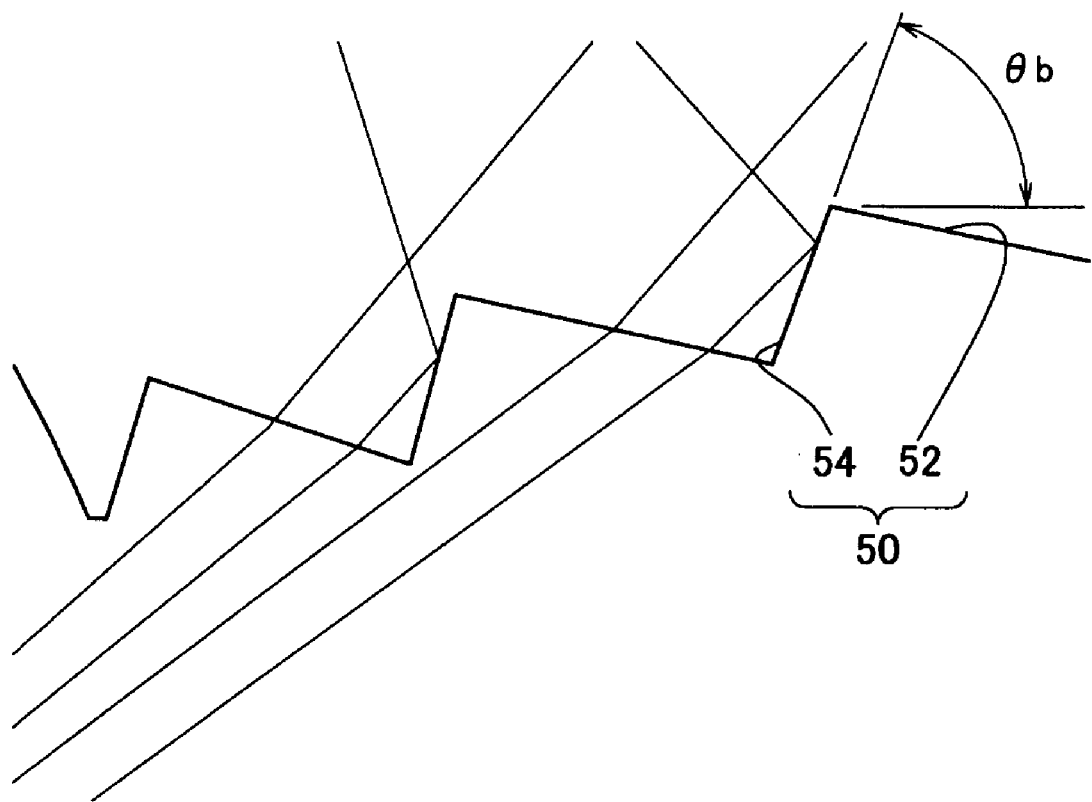
FIG. 27 is an enlarged diagram of a part around irregularities 50 of FIG. 26.

On the other hand, also when the tilt angle θb of the second slope 54 is too large, the variation in luminance can become larger due to the abnormal light emission. FIG. 26 is an explanatory diagram showing a travelling path of a light exited from the center of the LED 22 when the tilt angle θb of the second slope 54 is large and the position of the LED 22 is backward offset from the normal position. FIG. 27 is an enlarged diagram of a part around the irregularities 50 of FIG. 26.

As shown in FIG. 27, when the tilt angle θb of the second slope 54 is too large, the light, which is originally refracted at the first slope 52 and then directly travels toward the light exit face of the light guide plate 24, is fully reflected on the second slope 54 and then travels in the optical axis direction of the LED 22. Consequently, as shown in FIG. 26, the light refracted at the first slope 52 and then fully reflected on the second slope 54 transmits the light exit face 40 of the light guide plate 24, and thus abnormal light emission occurs at the center of the optical axis of the LED 22, which causes a variation in luminance to be larger.

In this manner, when the LED 22 is backward offset from the normal position, there occurs an issue that the light which has to be reflected inside the light guide plate 24 multiple times and exited from the light guide plate 24 is abnormally emitted at the light exit face 40.

An image displaying apparatus 200 including the light emitting apparatus 100 according to one embodiment of the present invention can solve the above issues. The light emitting apparatus 100 having the above characteristics will be described below in detail.

<2. Schematic Configuration of Light Emitting Apparatus 100 According to One Embodiment of the Present Invention>

FIG. 1 is an explanatory diagram showing a schematic configuration of the light emitting apparatus 100 according to one embodiment of the present invention. As shown in FIG. 1, the irregularities 150 formed on a light incident face 138 of a light guide plate 124 are formed so as to correspond to the positional offset of the LED 22 so that the light emitting apparatus 100 according to the present embodiment can solve the above issues. The irregularities 150 are continuously formed at the outer periphery of a first concave 142 formed at a position opposing the LED 22 of the light incident face 138 similarly as in the light emitting apparatus 16.

The explanatory diagram shown in FIG. 1 shows the travelling paths of the lights exited from the LED 22 when the LED 22 is at the normal position or when the sealing resin 36 supporting the LED 22 contacts the light incident face 138 of the light guide plate 124. As shown in FIG. 1, when the LED 22 is at the normal position, a light exited from the center of the LED 22 is incident into the light guide plate 124 while being refracted at the first concave 142 of the light guide plate 124. Thereafter, after the light is repeatedly reflected on the light exit face 140 and the light incident face 138, the light is reflected by the reflection mechanism 46 shown in FIG. 22 and transmits the light exit face 140, for example.

Figure 2:
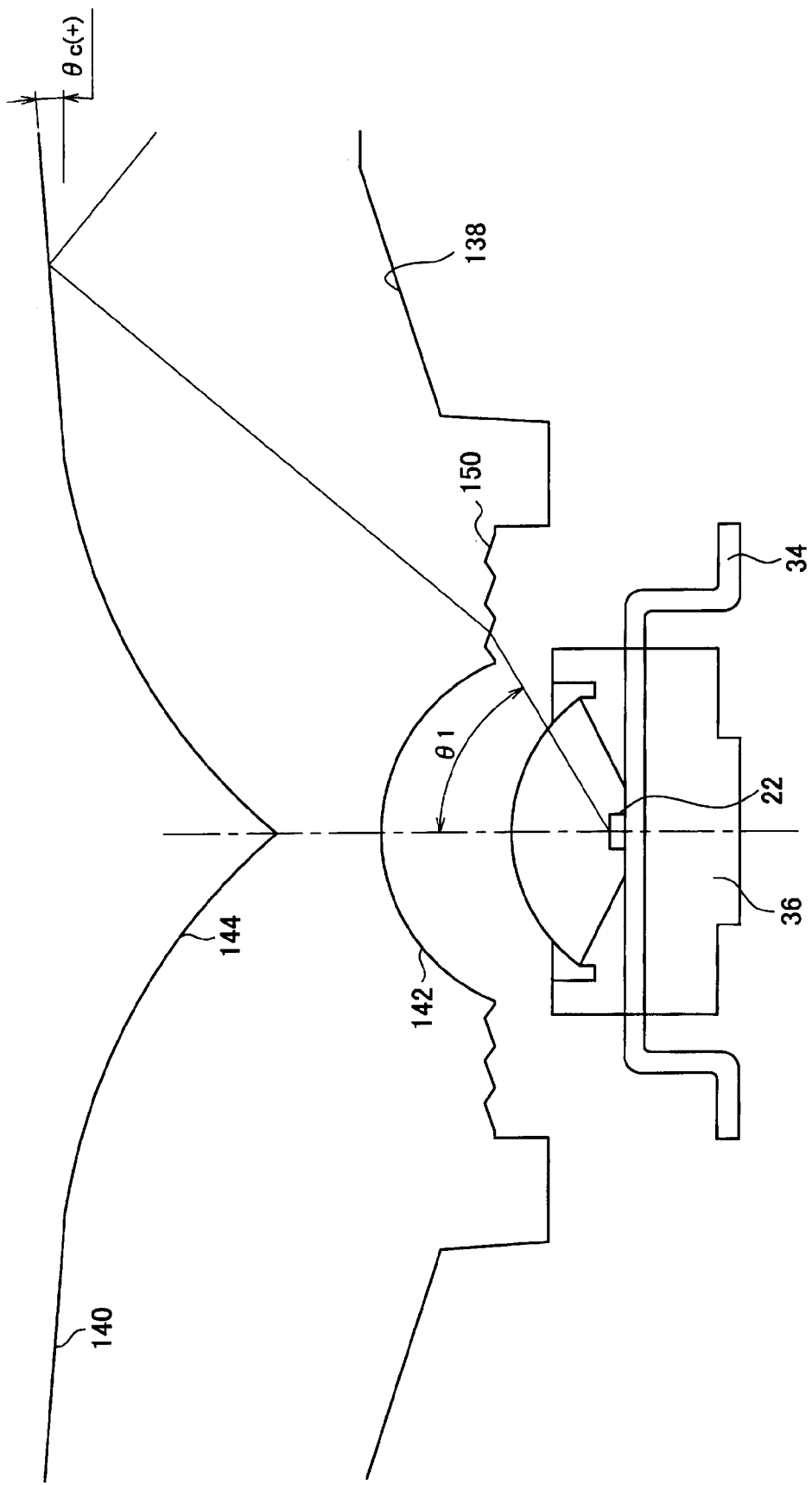
FIG. 2 is an explanatory diagram showing a schematic configuration of the light emitting apparatus 100 when a position of a LED 22 is backward offset according to the present embodiment.
Figure 3:
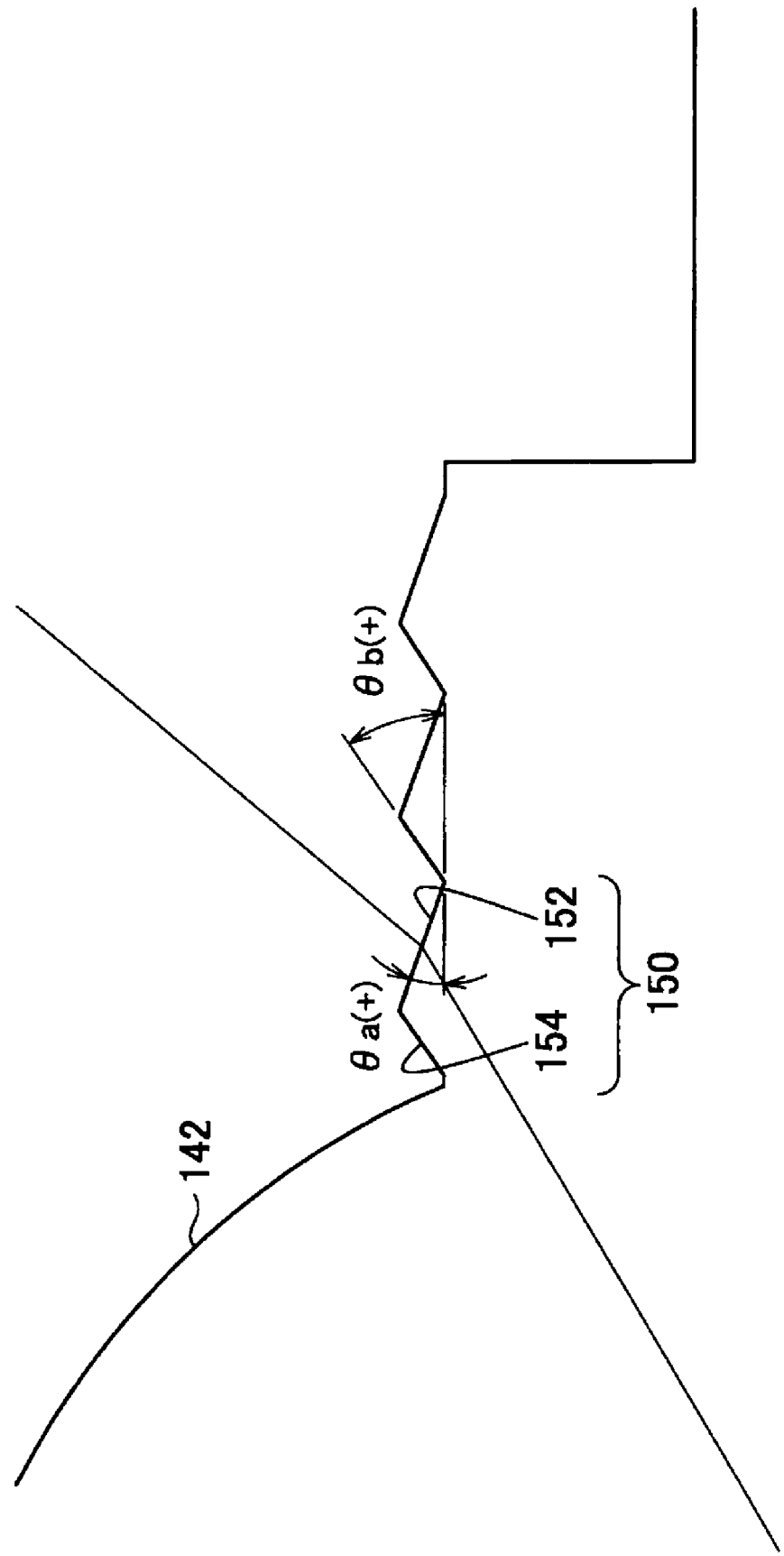
FIG. 3 is an enlarged diagram of a part around irregularities 150 of FIG. 2.

On the other hand, even when the position of the LED 22 is backward (in the z-axis negative direction) offset from the original position, the light guide plate 124 according to the present embodiment is utilized, thereby restricting a variation in luminance from becoming larger. FIG. 2 is an explanatory diagram showing a schematic configuration of the light emitting apparatus 100 when the position of the LED 22 is backward offset. FIG. 3 is an enlarged diagram of a part around the irregularities 150 of FIG. 2.

As shown in FIG. 2, the position of the LED 22 is backward offset from the original position so that some lights exited from the LED 22 are refracted at the irregularity 150 of the light guide plate 124 to be incident into the light guide plate 124. In the light emitting apparatus 100 according to the present embodiment, the angle between the first slope 152 and the second slope 154 configuring the irregularity 150, and the plane (xy plane) of the light guide plate 124 is designed based on the angle between the light exited from the LED 22 and the optical axis direction (the z-axis positive direction) of the LED 22. The first slope 152 and the second slope 154 of the irregularity 150 as one characteristic of the present embodiment will be described below.

At first, as shown in FIG. 2, the angle between the line connecting the center of the LED 22 and the slope and the optical axis direction of the LED 22 is assumed as θ1. The angle between the light exit face 140 of the light guide plate 124 and the plane (xy plane) of the light guide plate 124 is assumed as θc. As shown in FIG. 3, the angle between the first slope 152 of the irregularity 150 and the plane (xy plane) of the light guide plate 124 is assumed as θa. Further, the angle between the second slope 154 of the irregularity 150 and the plane (xy plane) of the light guide plate 124 is assumed as θb.

In the present embodiment, the angle θa of the first slope 152 and the angle θb of the second slope 154 are set as in the following equations (1) to (3), thereby restricting a variation in luminance due to the positional offset of the LED 22.

[Formula 3]

$$\theta_a \geq \tan^{-1}\left[\frac{n \cdot \sin\left\{\sin^{-1}\left(\frac{1}{n}\right) - \theta_c\right\} - \sin\theta_1}{n \cdot \cos\left\{\sin^{-1}\left(\frac{1}{n}\right) - \theta_c\right\} - \cos\theta_1}\right] \quad \text{Equation (1)}$$

[Formula 4]

$$\theta_b \leq \frac{\pi - \left[\theta_a + \sin^{-1}\left\{\frac{\sin(\theta_1 - \theta_a)}{n}\right\}\right] - \left\{\sin^{-1}\left(\frac{\sin\theta_c}{n}\right) - \theta_c\right\}}{2} \quad \text{Equation (2)}$$

[Formula 5]

$$\theta_b \geq \frac{\pi}{2} - \theta_1 \quad \text{Equation (3)}$$

where "n" is a refractive index of the light guide plate 124 and is arbitrarily changed depending on a material forming the light guide plate 124.

As is clear from the above equations, the angle θa of the first slope 152 and the angle θb of the second slope 154 are determined based on the angle θ1 between the light exited from the LED 22 and the optical axis direction of the LED 22. Thus, in consideration of the amount of offset in the LED 22 due to a component-level tolerance of the LED 22, a temporal change and the like, the angle θa of the first slope 152 and the angle θb of the second slope 154 are arbitrarily set to design the irregularity 150 of the light guide plate 124. θ1 takes a different value depending on the position of the irregularity 150. Thus, for example, the angle between the line connecting the center of the first slope 152 and the center of the LED 22 and the optical axis direction of the LED 22 may be set as θ1 for each first slope 152. Thus, the first slope 152 and the second slope 154 can be formed at an appropriate angle depending on the position of the irregularity 150. Further, the angle θc of the light exit face 140 can be arbitrarily changed depending on a specification requested for the light guide plate 124 and is not limited to a specific angle.

<3. Solution of Issues Due to Positional Offset of LED 22 in Light Emitting Apparatus 100>

Figure 4:
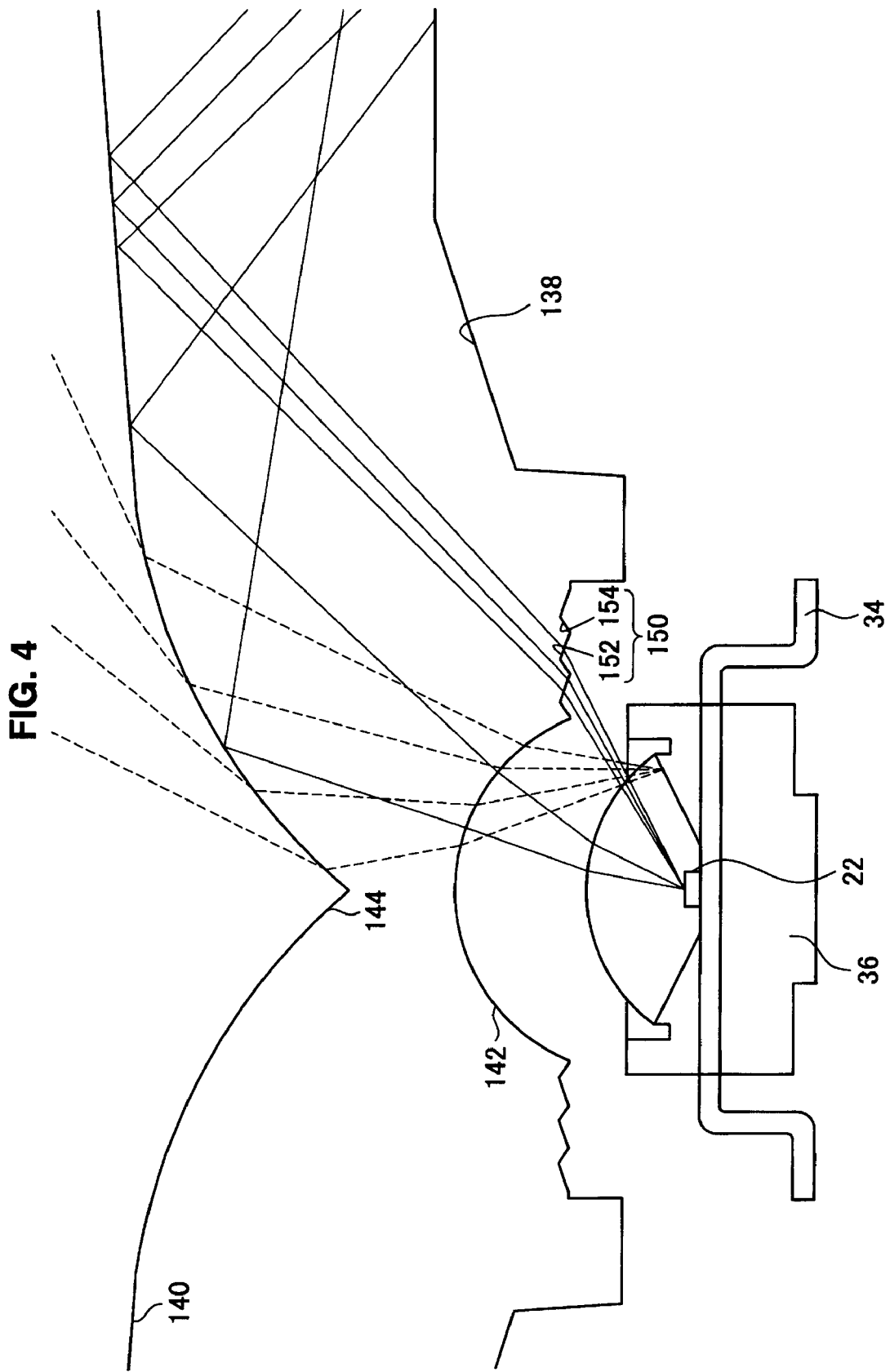
FIG. 4 is an explanatory diagram showing travelling paths of lights emitted from the center of the LED 22 when the position of the LED 22 is backward offset from a normal position according to the present embodiment.

FIG. 4 is an explanatory diagram showing the travelling paths of the lights exited from the center of the LED 22 when the position of the LED 22 is backward offset from the normal position in the light emitting apparatus 100 according to the present embodiment.

As shown in FIG. 4, some lights exited from the center of the LED 22 reach the irregularity 150 at the light incident face 138 of the light guide plate 124. The above equation (1) is directed for calculating the angle θa such that the light refracted at the first slope 152 and incident into the light guide plate 124 is then fully reflected on the light exit face 140. Thus, each first slope 152 is formed at the angle θa set in the above equation (1) so that the light refracted at the first slope 152 and incident into the light guide plate 124 is fully reflected on the light exit face 140.

The above equation (3) is directed for calculating the minimum value of the angle θb in order to prevent some lights exited from the center of the LED 22 from being directly refracted at the second slope 152 and incident into the light guide plate 124. Thus, each second slope 154 is formed at the angle θb equal to or larger than the angle set in the above equation (3), thereby preventing some lights exited from the center of the LED 22 from being directly refracted at the second slope 154 and incident into the light guide plate 124. Consequently, the light emitting apparatus 100 according to the present embodiment is utilized, thereby restricting the variation in luminance as described in FIGS. 24 and 25.

Further, the above equation (2) is directed for calculating the maximum value of the angle θb in order to reduce the absolute amount of lights, among the lights exited from the center of the LED 22, which are refracted at the first slope 152 and then incident into the light guide plate 124 to be fully reflected on the second slope 154. Thus, each second slope 154 is formed at the angle θb equal to or smaller than the angle set in the above equation (2), thereby reducing the lights which are refracted at the first slope 152 and then incident into the light guide plate 124 to be fully reflected on the second slope 154.

Figure 5:
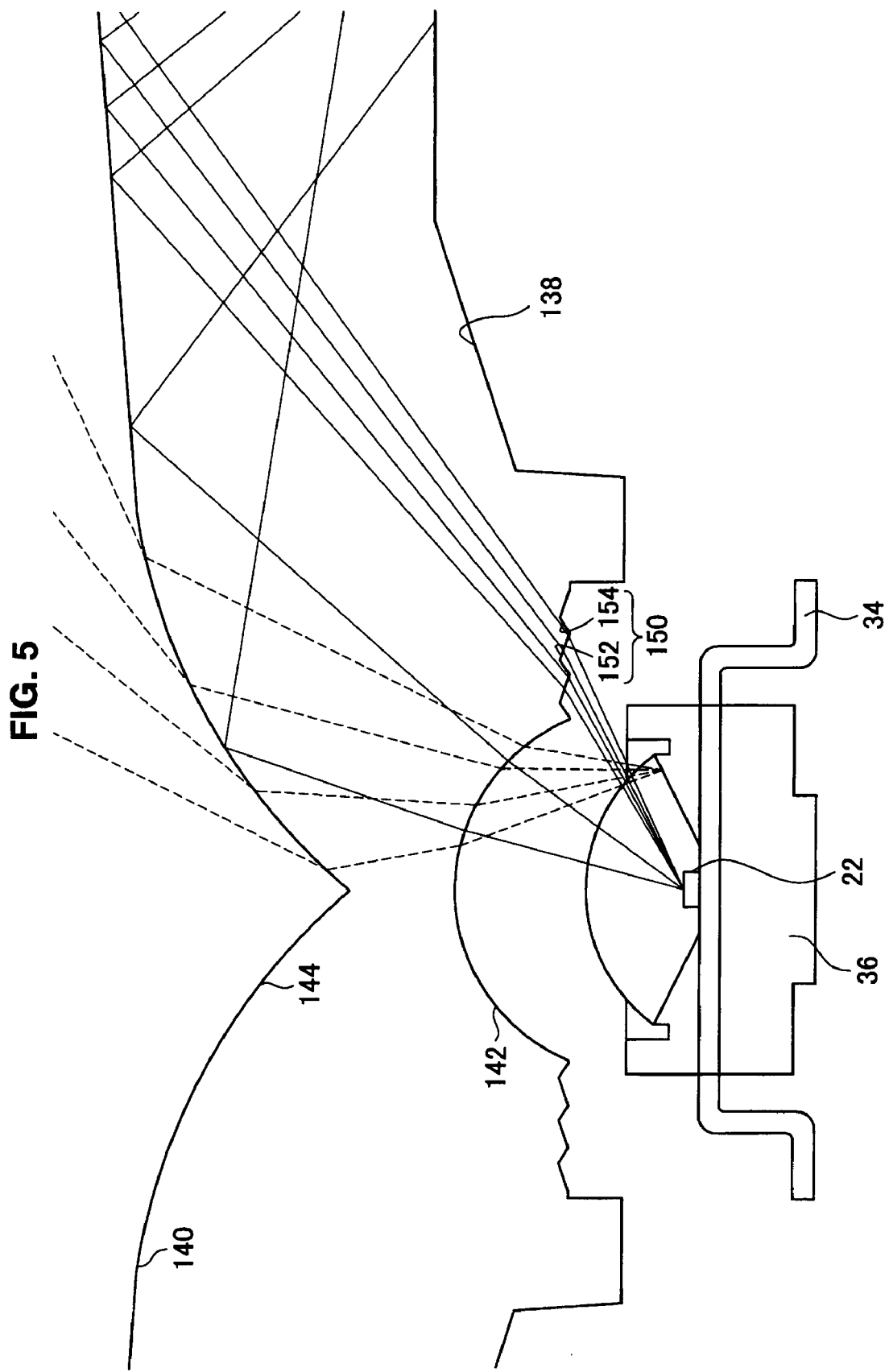
FIG. 5 is an explanatory diagram showing travelling paths of lights refracted at a first slope 152 and incident into a light guide plate 124 according to the present embodiment.
Figure 6:
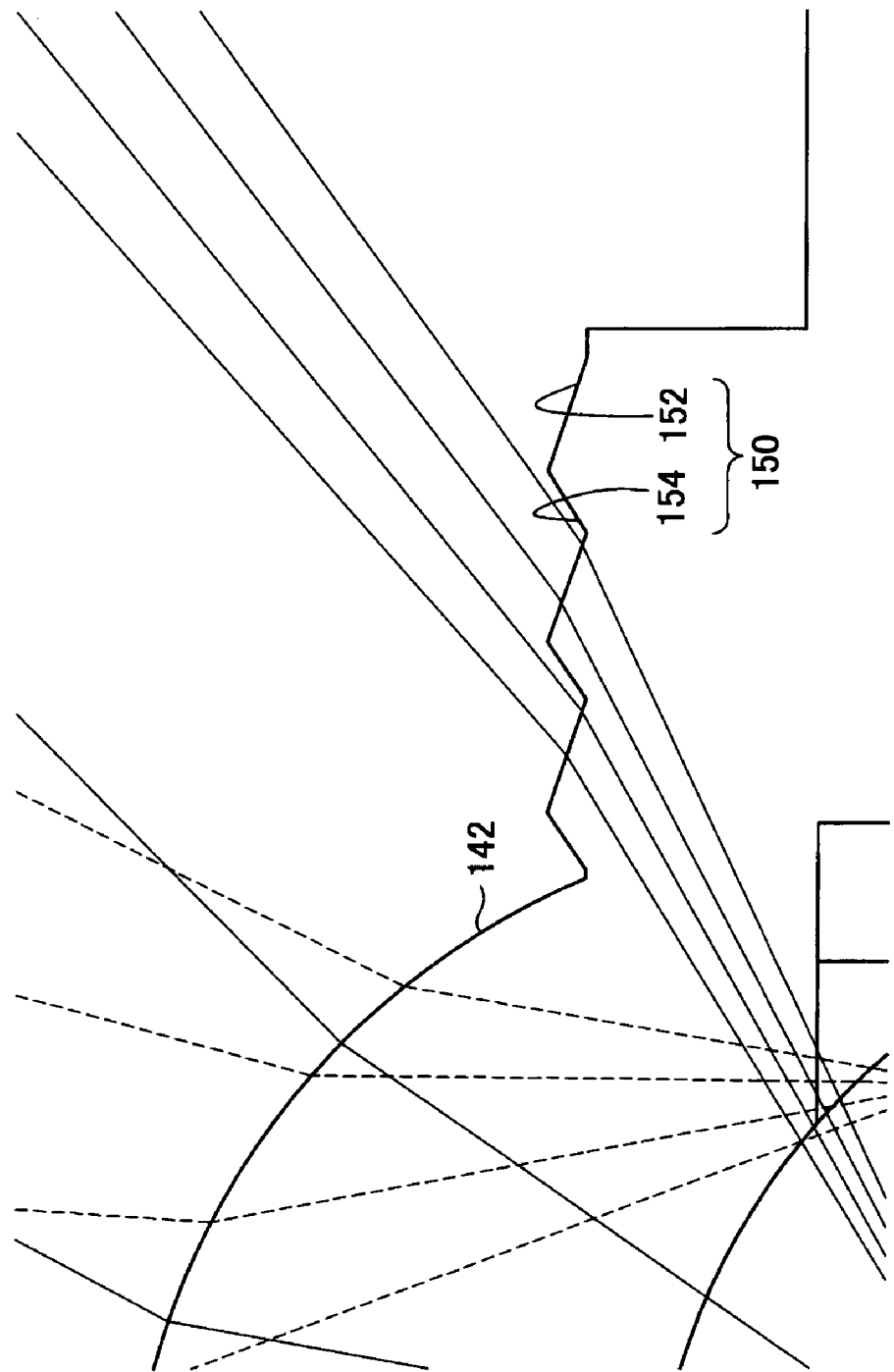
FIG. 6 is an enlarged diagram of a part around irregularities 150 of FIG. 5.

FIG. 5 is an explanatory diagram showing the travelling paths of the lights refracted at the first slope 152 and incident into the light guide plate 124 according to the present embodiment. FIG. 6 is an enlarged diagram of a part around the irregularities 150 of FIG. 5. As described above, the maximum angle of the second slope 154 is set depending on the incident angle θ1 of the LED 22. Thus, as shown in FIGS. 5 and 6, many of the lights refracted at the first slope 152 and incident into the light guide plate 124 travels toward the light exit face 140 without being fully reflected on the second slope 154. In other words, the absolute amount of lights, among the lights refracted at the second slope 154 and incident into the light guide plate 124, which are fully reflected on the second slope 154 can be remarkably reduced. In this manner, the light emitting apparatus 100 according to the present embodiment is utilized, thereby further restricting the variation in luminance due to the full reflection on the second slope 154 than in the example utilizing a light guide plate 124 in related art as described in FIGS. 26 and 27.

As described above, the angle θa of the first slope 152 is set to be larger than the angle calculated in the above equation so that the lights refracted at the first slope 152 and incident into the light guide plate 124 among the lights exited from the center of the LED 22 can be fully reflected on the light exit face 140. The angle θb of the second slope 154 is set to be larger than the angle calculated in the above equation (3), thereby preventing the abnormal light emission due to the lights directly refracted at the second slope 154 and incident into the light guide plate 124. Further, the angle θb of the second slope 154 is set to be smaller than the angle calculated in the above equation (2), thereby reducing the absolute amount of lights fully reflected on the second slope 154 among the lights refracted at the first slope 152 and incident into the light guide plate 124. Consequently, the light emitting apparatus 100 according to the present embodiment is utilized, thereby preventing the variation in luminance of the lights exited from the light guide plates 124 from becoming larger even when the LED 22 is offset from the normal position.

Figure 7:
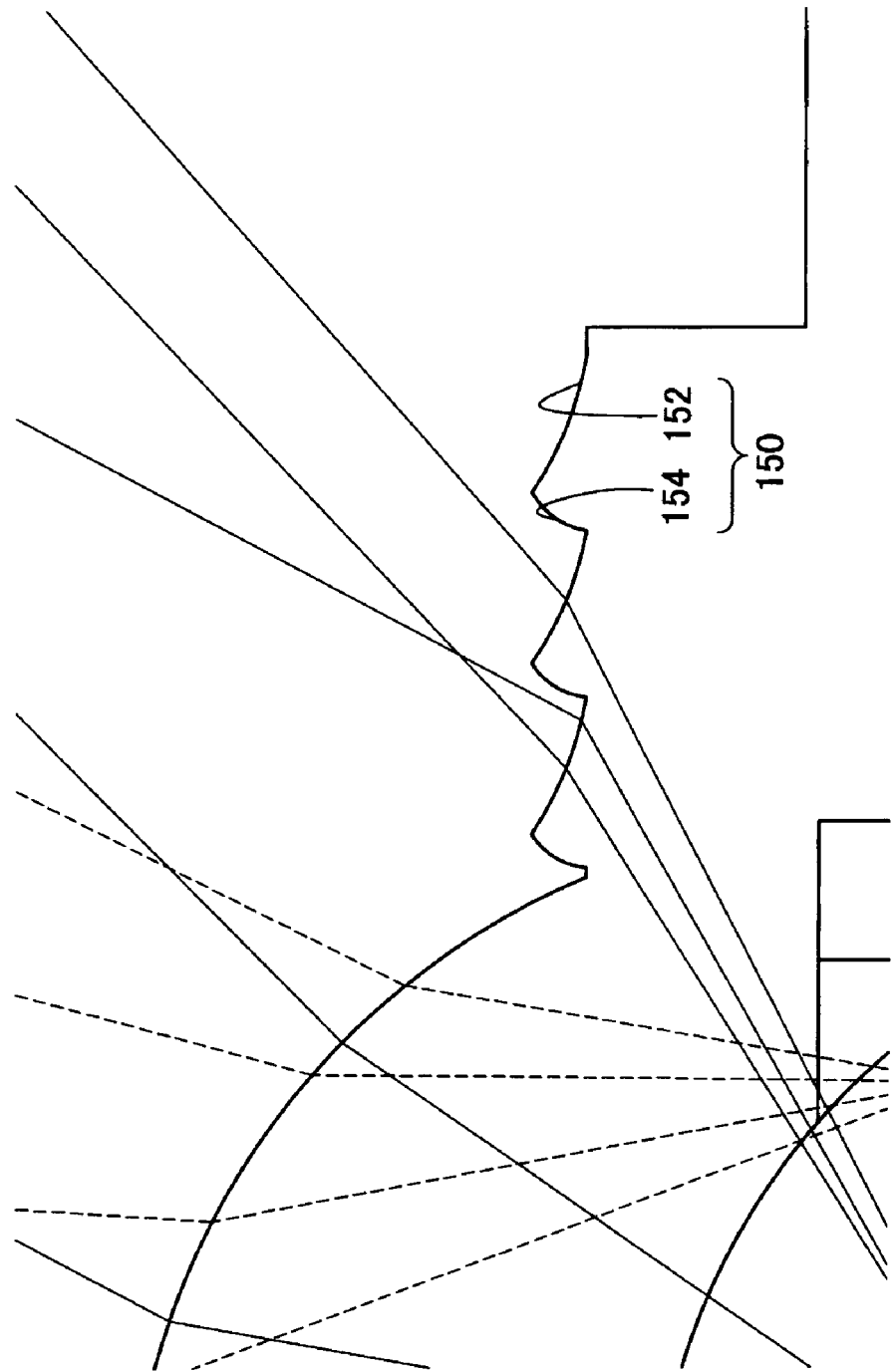
FIG. 7 is an explanatory diagram of a case in which the first slope 152 and the second slope 154 are a curved face according to the present embodiment.

The first slope 152 and the second slope 154 do not necessarily need to be a plane if the tilt angles are set based on the above equations (1) to (3). For example, as shown in FIG. 7, the first slope 152 and the second slope 154 may be a curved face having a predetermined curvature.

<4. Simulation Results>

Next, there will be described the result obtained by comparing with the case of the light emitting apparatus 16 in related art and making simulations for the effect that a variation in luminance is reduced by utilizing the light emitting apparatus 100 according to the present embodiment.

(Simulation Results of Luminance Distribution when One Light is Lit)

Figure 8:
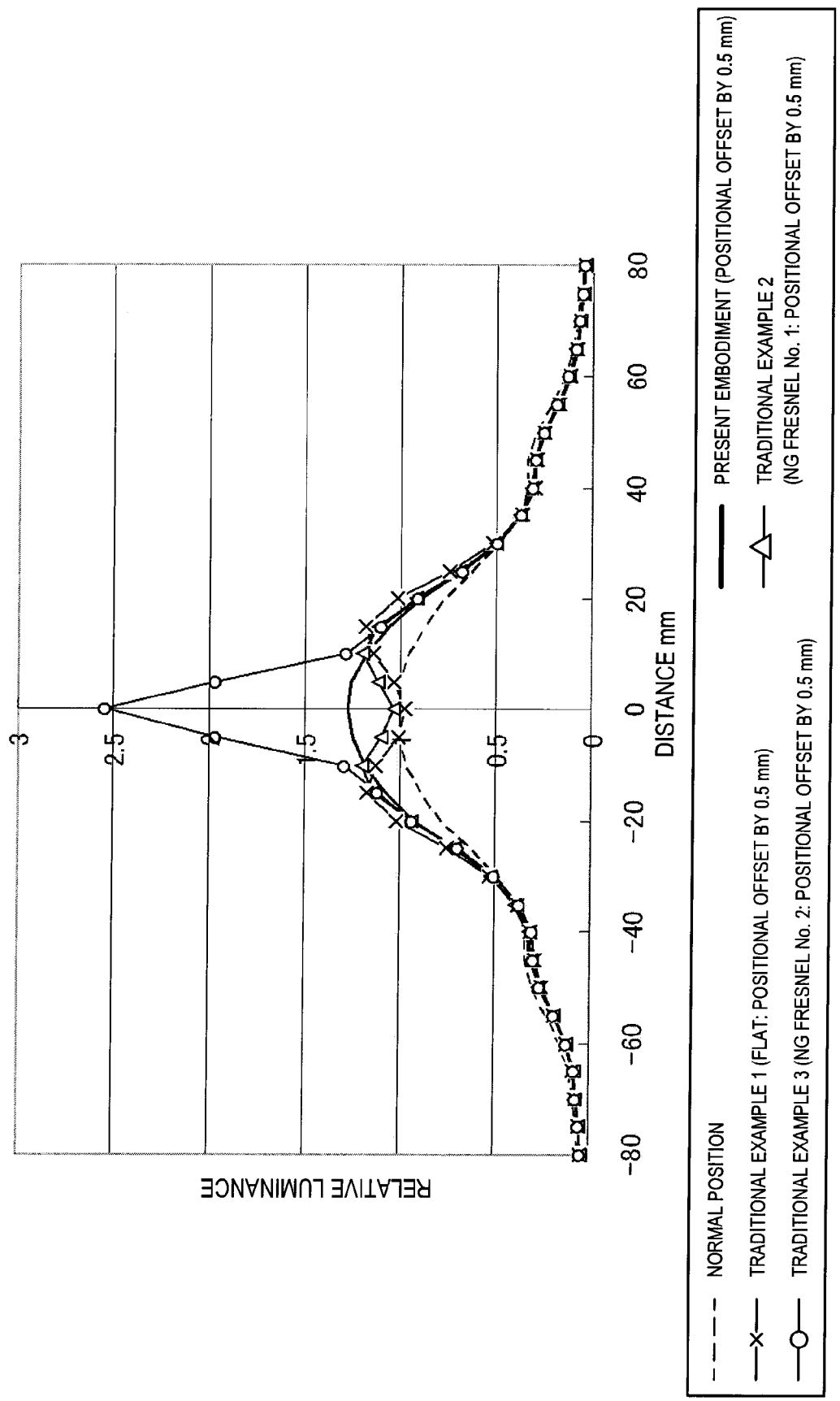
FIG. 8 is an explanatory diagram showing the simulation results of a luminance distribution when one LED 22 is lit up.
Figure 9:
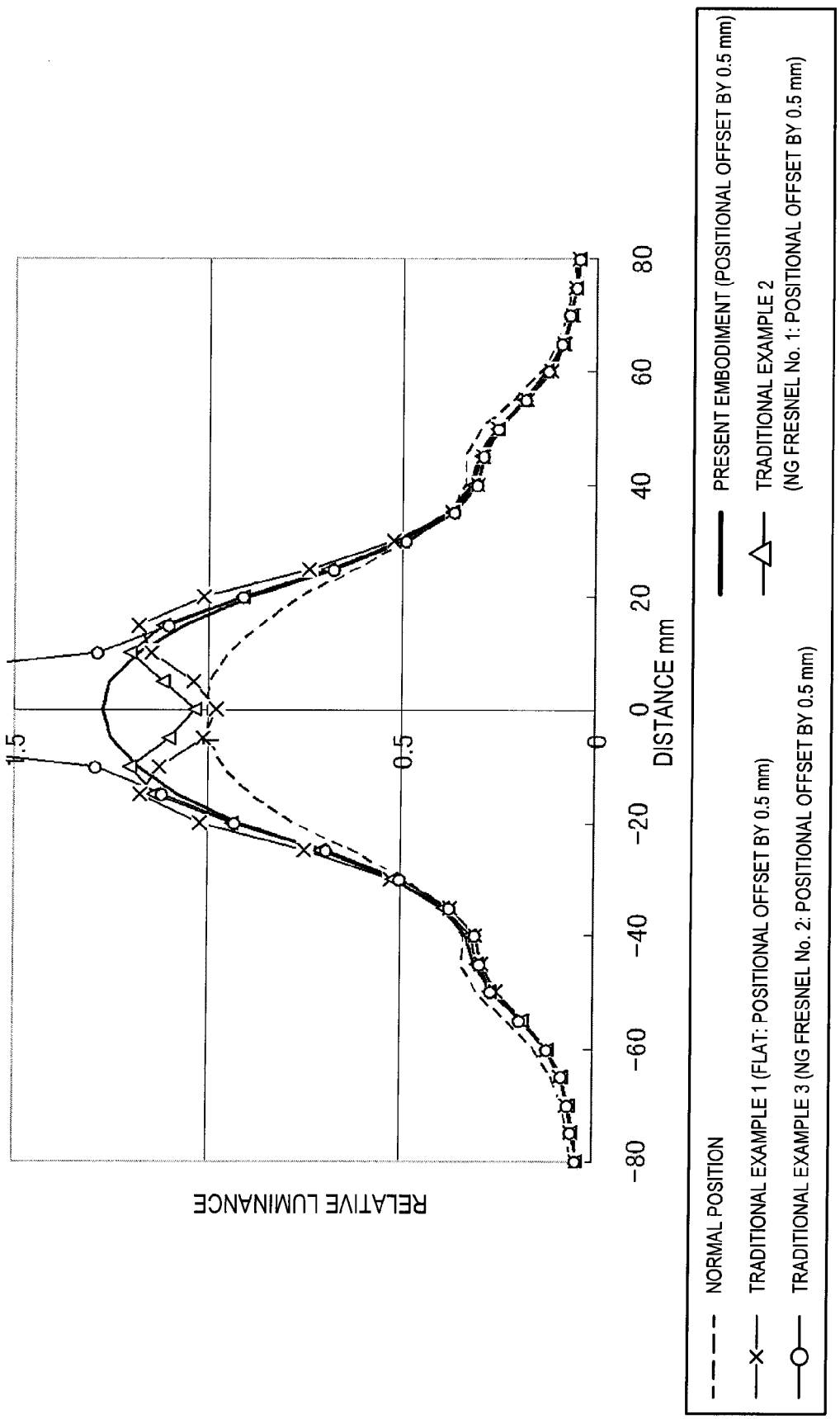
FIG. 9 is an explanatory diagram showing a result after a scale of relative luminance is changed in the simulation results of FIG. 8.

FIG. 8 shows the simulation results indicating the luminance distributions depending on a distance from the center position of the LED 22 when only one LED 22 is lit. FIG. 9 is an explanatory diagram showing a result obtained by changing a scale of relative luminance on the vertical axis in the simulation results of FIG. 8. In the simulation results of FIG. 8, the distance on the horizontal axis indicates an offset distance from the center position of the LED 22 when the center position of the LED 22 is assumed as 0 mm. The relative luminance on the vertical axis indicates a relative luminance when a luminance at the center position of the LED 22 is assumed as 1.

FIG. 8 shows the simulation result when the LED 22 is set at the normal position in a broken line in utilizing the light emitting apparatus 100 according to the above embodiment. Further, FIG. 8 shows the simulation result when the LED 22 is backward (in the z-axis negative direction) offset from the normal position by 0.5 mm in a solid line in utilizing the light emitting apparatus 100 according to the above embodiment. Further, FIG. 8 shows the simulation result when the LED 22 is backward offset from the normal position by 0.5 mm as a related art example 1 in a x-plotted solid line in utilizing the light emitting apparatus 16 including the light guide plate 24 having the flat part 48 as shown in FIG. 23 formed. Further, FIG. 8 shows the simulation result when the LED 22 is backward offset from the normal position by 0.5 mm as a related art example 2 in a triangle-plotted solid line in utilizing the light emitting apparatus 16 including the light guide plate 24 having the irregularities 50 as shown in FIGS. 24 and 25 formed. Furthermore, FIG. 8 shows the simulation result when the LED 22 is backward offset from the normal position by 0.5 mm as a related art example 3 in a circle-plotted solid line in utilizing the light emitting apparatus 16 including the light guide plate 24 having the irregularities 50 as shown in FIGS. 26 and 27 formed.

As shown in FIGS. 8 and 9, in the related art example 1, the relative luminance increases as the distance from the center of the LED 22 is longer. This is because the light refracted at the flat part 48 and incident into the light guide plate 24 transmits the light exit face 40 to cause the abnormal light emission as shown in FIG. 23.

Similarly as in the related art example 2, the relative luminance increases as the distance from the center of the LED 22 is longer. This is because the light refracted at the second slope 54 of the irregularity 50 and incident into the light guide plate 24 transmits the light exit face 40 to cause the abnormal light emission as shown in FIGS. 24 and 25.

In the related art example 3, it can be seen that the relative luminance at the center of the LED 22 is remarkably large. This is because the light refracted at the first slope 52 and fully reflected on the second slope 54 in the optical axis direction of the LED 22 transmits the light exit face 40 of the light guide plate 24 to cause the abnormal light emission at the center of the optical axis of the LED 22 as shown in FIGS. 26 and 27.

On the other hand, it can be seen that a luminance distribution curve similar to the luminance distribution curve at the normal position is obtained even when the LED 22 is backward offset by 0.5 mm in utilizing the light emitting apparatus 100 according to the present embodiment. This is because the irregularity 150 is formed with the first slope 152 having the angle θa and the second slope 154 having the angle θb which are determined based on the above equations (1) to (3).

(Simulation Results of Luminance Distribution when all the Lights are Lit)

Figure 10:
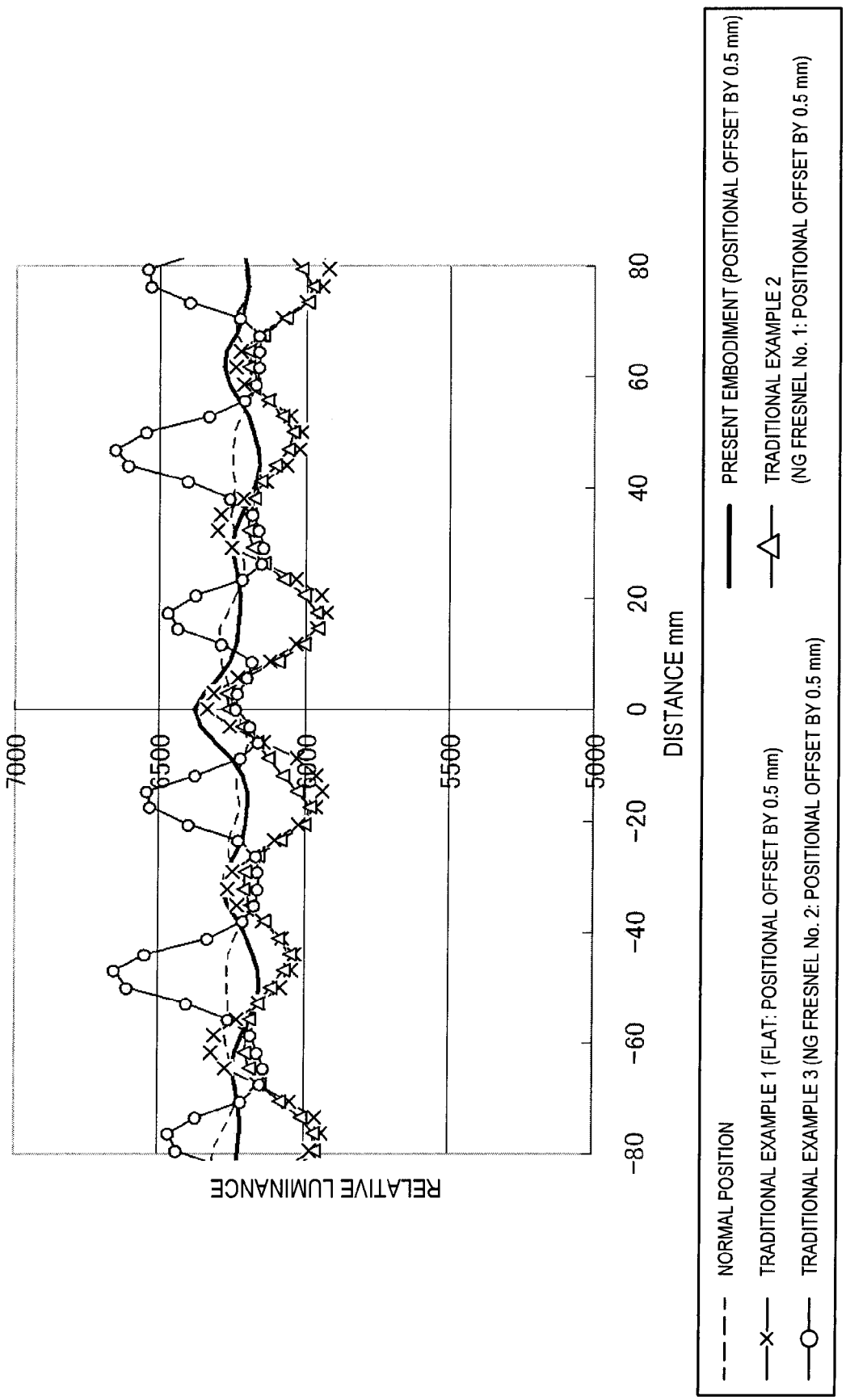
FIG. 10 is an explanatory diagram showing the simulation results of a luminance distribution when all the LEDs 22 are lit up.
Figure 11:
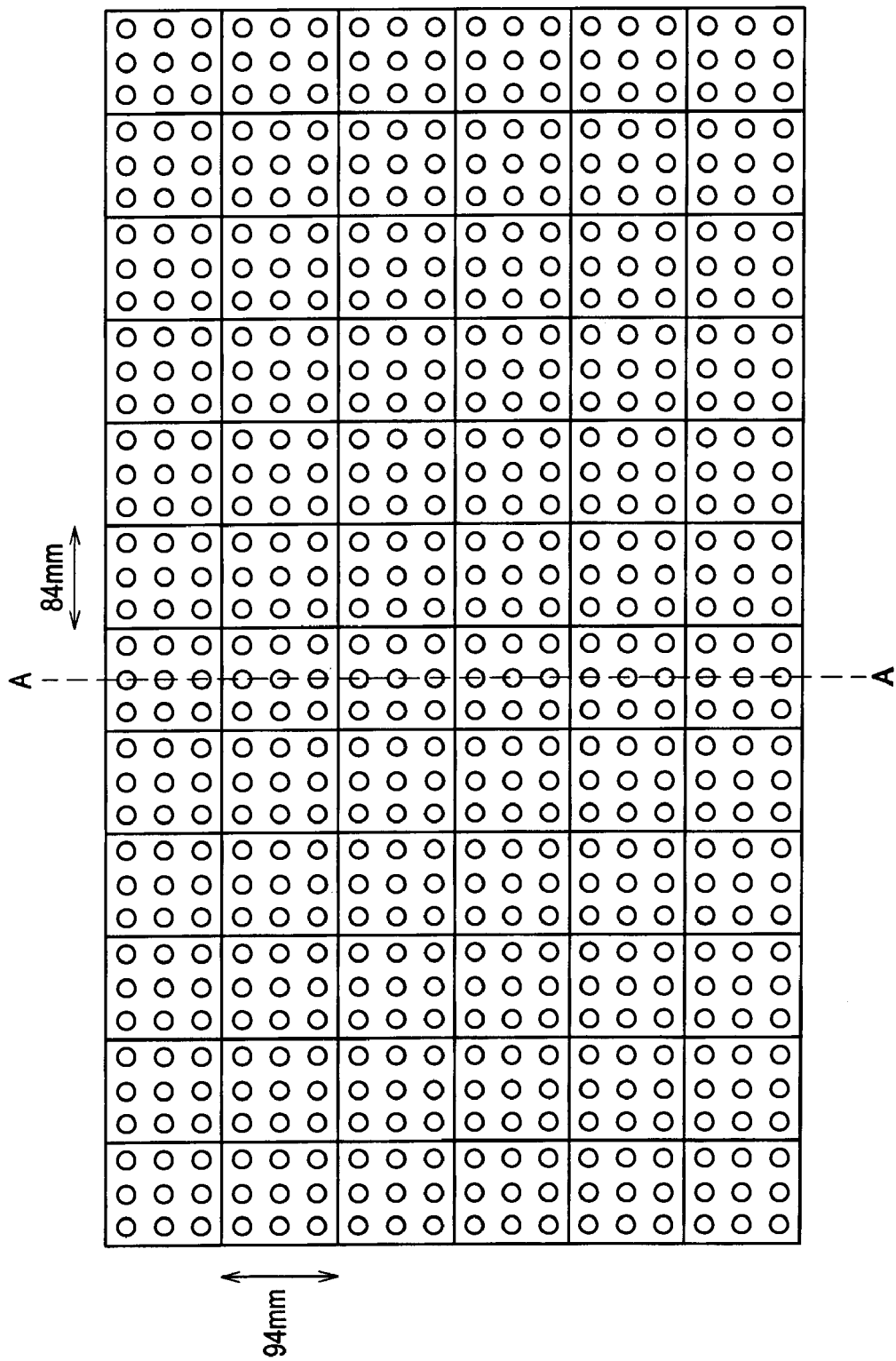
FIG. 11 is an explanatory diagram showing the measurement positions of the simulation results of FIG. 10.

Next, there will be described the simulation results of the luminance distribution when all the LEDs 22 are lit in the light emitting apparatus 100. FIG. 10 shows the simulation results of the luminance distribution when all the LEDs 22 are lit in the light emitting apparatus 100. FIG. 11 is an explanatory diagram indicating measurement positions of the simulation results of FIG. 10. The simulations shown in FIG. 10 indicate the luminance distributions along the line A-A when the light emitting apparatus 100 is divided into 72 blocks of 6×12 and the center position of the line A-A is assumed as "distance 0 mm" as shown in FIG. 11. Further, the simulation results shown in FIG. 10 indicate the results of the case where the LED 22 is at the normal position according to the present embodiment, the case where the LED 22 is backward offset by 0.5 mm, the related art example 1, the related art example 2 and the related art example 3 similarly as the simulations shown in FIGS. 8 and 9.

As shown in FIG. 10, when the simulation results are compared between when the LED 22 is at the normal position and when the LED 22 is backward offset from the normal position by 0.5 mm, it can be seen that the light emitting apparatus 100 according to the present embodiment has the minimum variation in luminance. For example, it can be seen that the relative luminance between the LEDs 22 is remarkably small in the related art example 1 and the related art example 2 while the relative luminance between the LEDs 22 is remarkably large in the related art example 3.

FIGS. 12 to 16 show the simulation results three-dimensionally indicating the luminance distribution in one block of 84 mm×94 mm in the light emitting apparatus 100 shown in FIG. 11 in order to more explicitly define the above simulation results.

Figure 12:
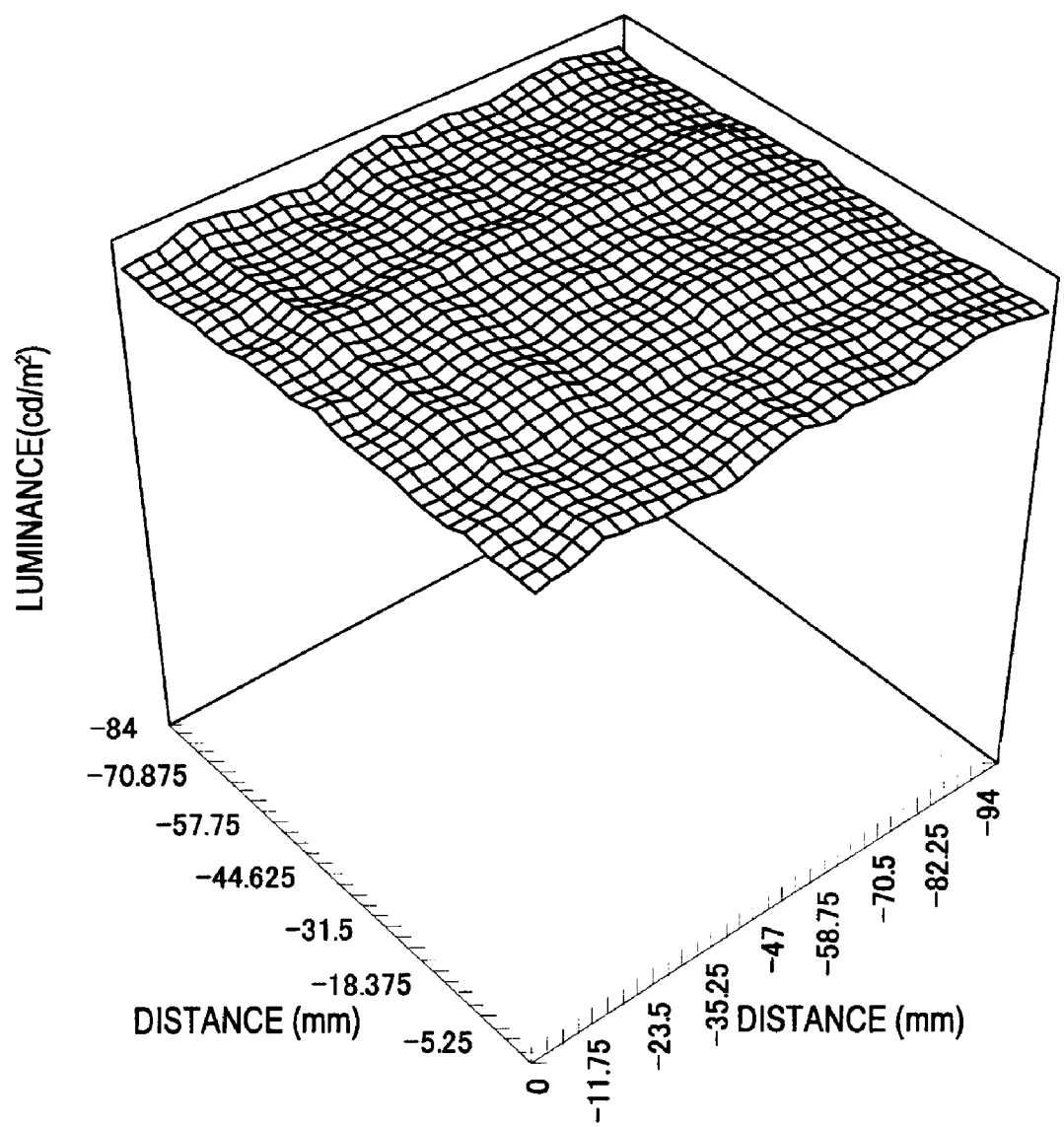
FIG. 12 shows a simulation result three-dimensionally indicating a luminance distribution when the LED 22 is at a normal position in the light emitting apparatus 100 according to the present embodiment.
Figure 13:
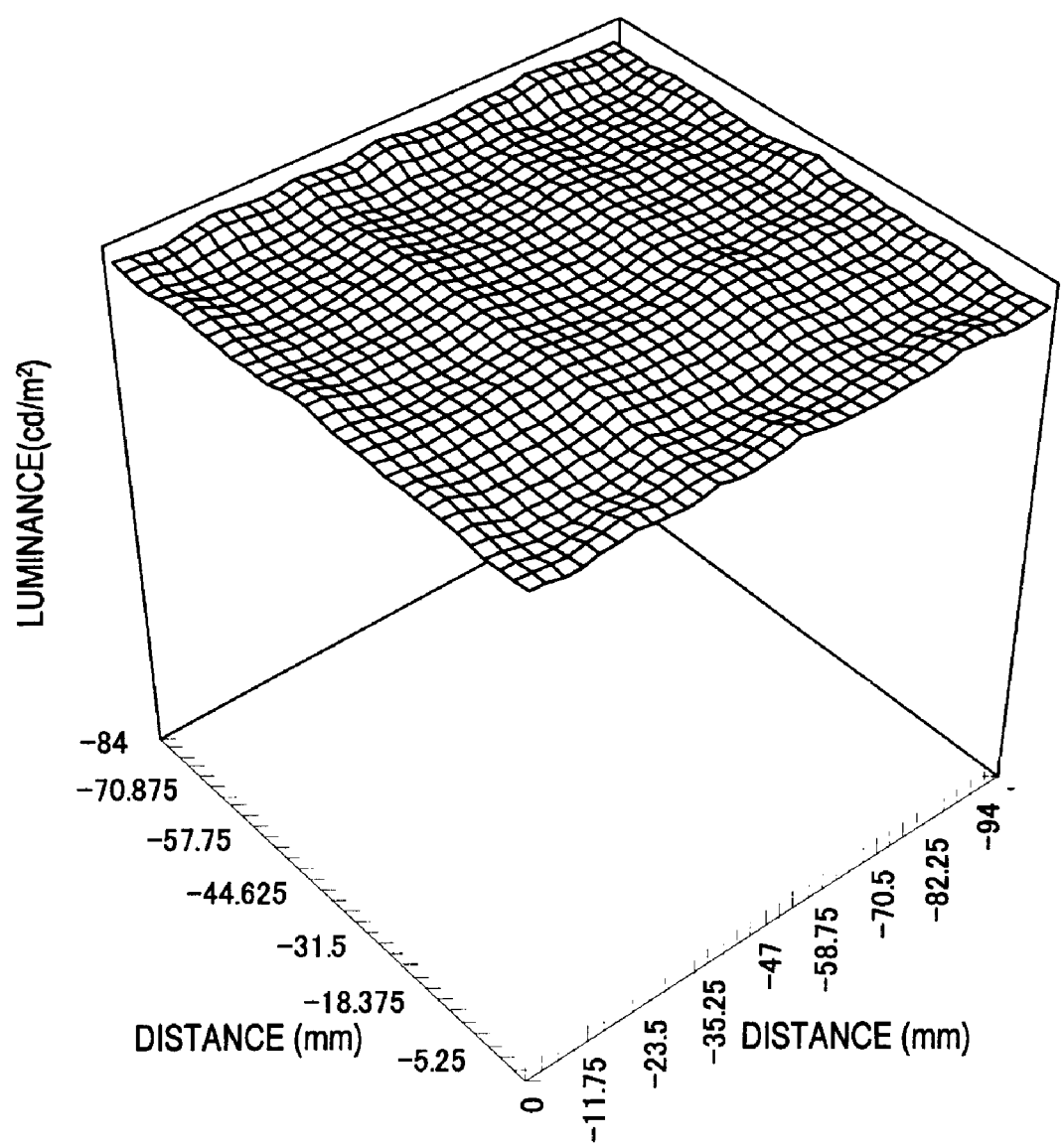
FIG. 13 shows a simulation result three-dimensionally indicating a luminance distribution when the LED 22 is backward offset from the normal position by 0.5 mm in the light emitting apparatus 100 according to the present embodiment.
Figure 14:
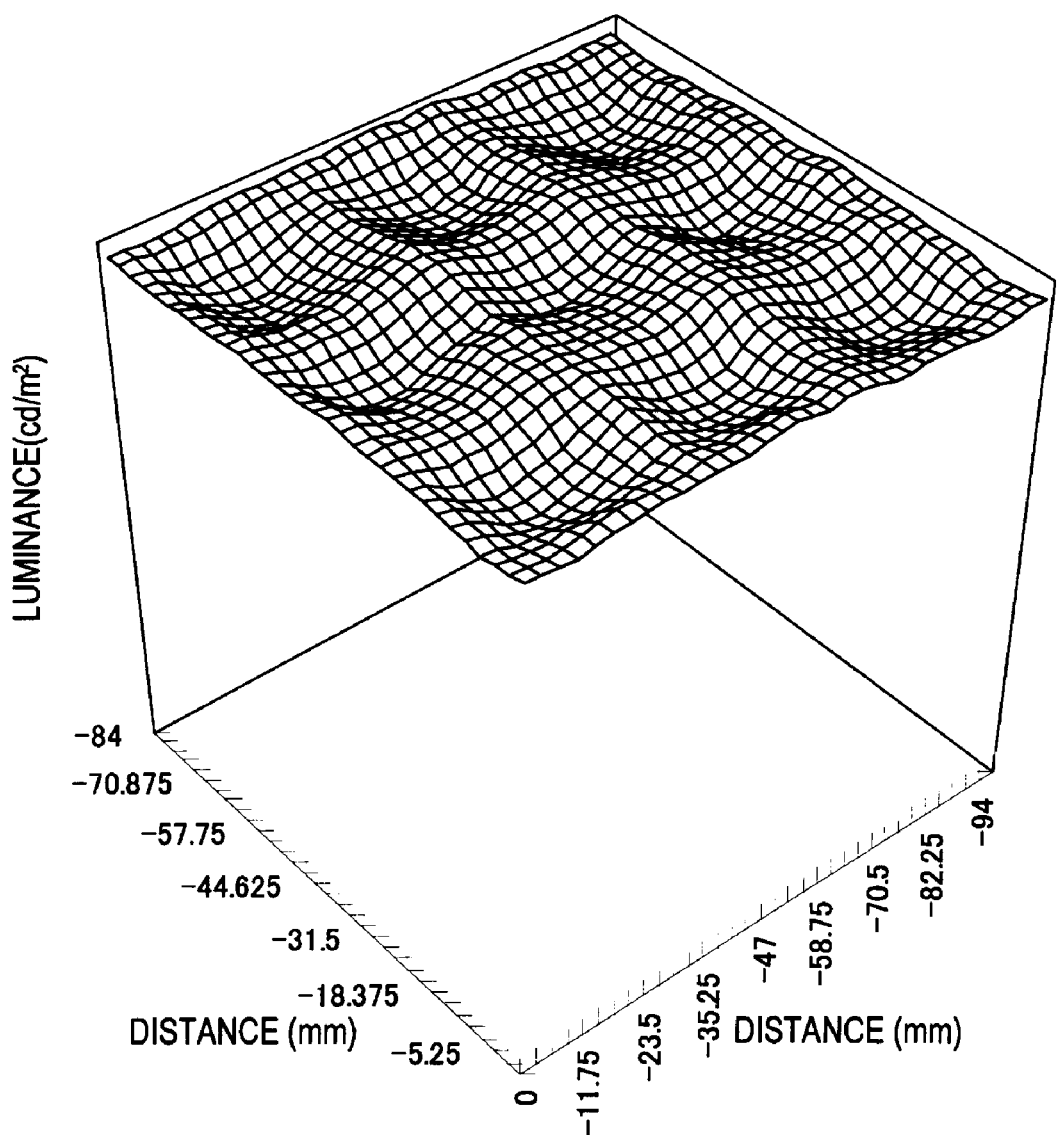
FIG. 14 shows a simulation result three-dimensionally indicating a luminance distribution according to a related art example 1.
Figure 15:
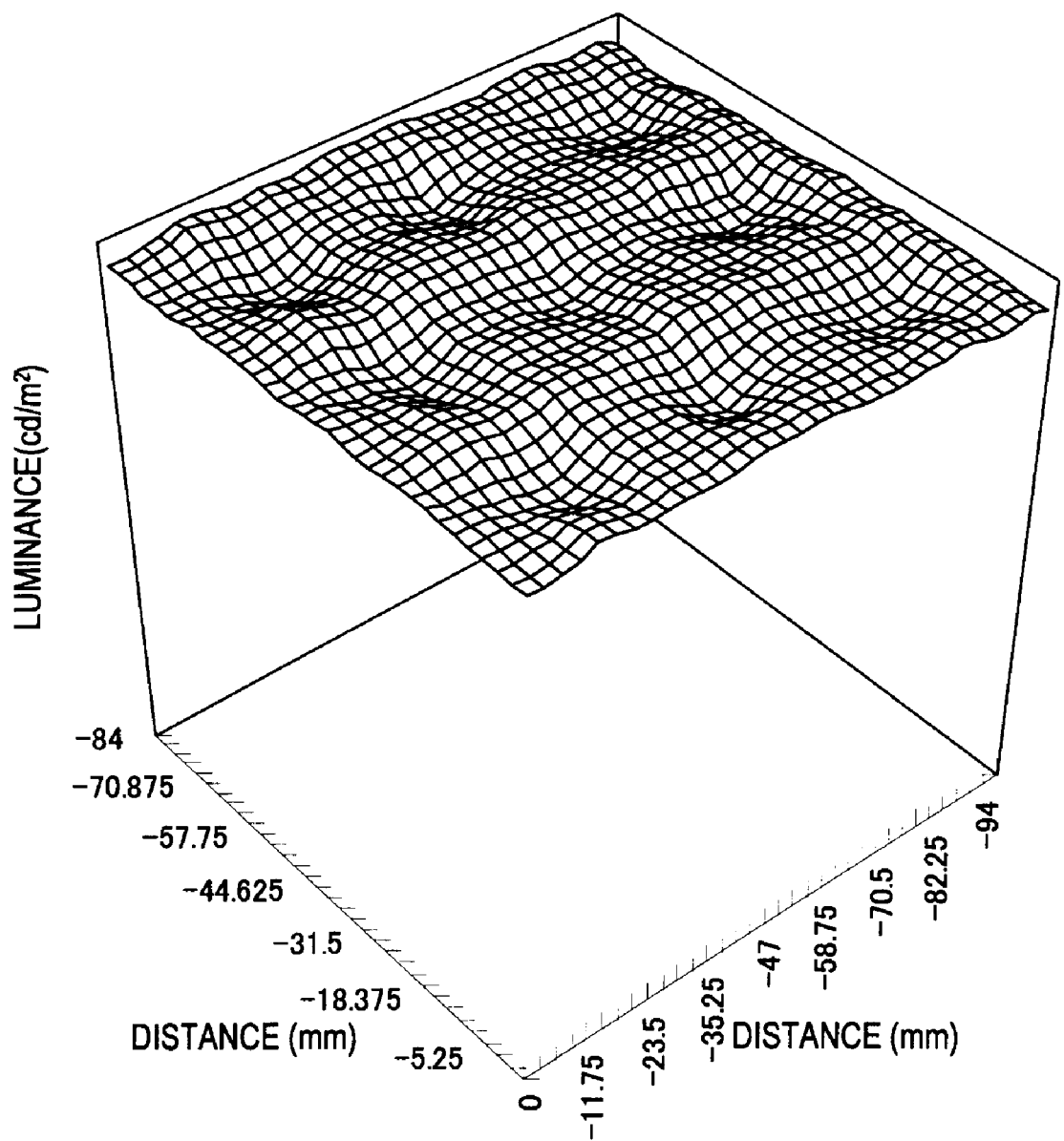
FIG. 15 shows a simulation result three-dimensionally indicating a luminance distribution according to a related art example 2.
Figure 16:
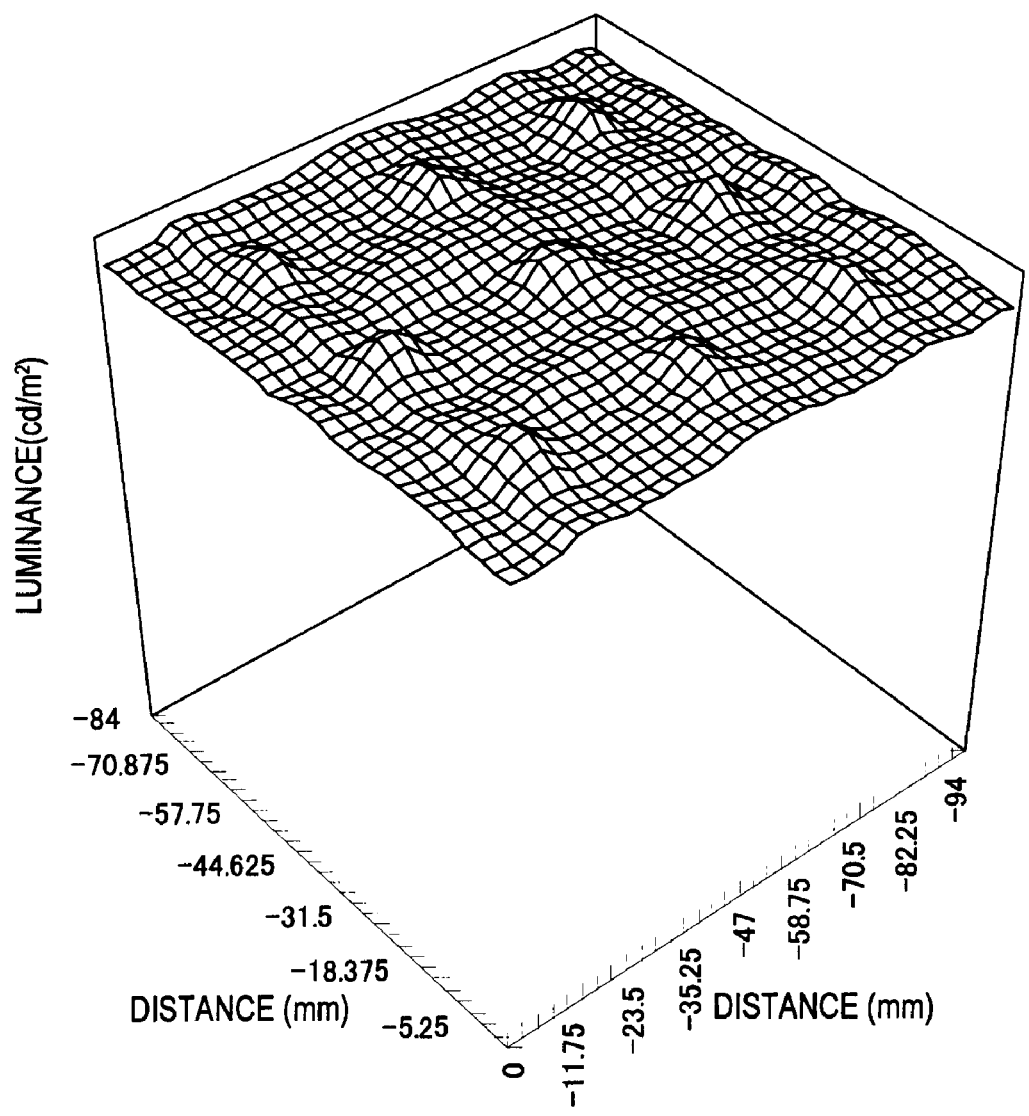
FIG. 16 shows a simulation result three-dimensionally indicating a luminance distribution according to a related art example 3.

FIG. 12 shows a luminance distribution when the LED 22 is at the normal position in the light emitting apparatus 100 according to the present embodiment. FIG. 13 shows a luminance distribution when the LED 22 is backward offset from the normal position by 0.5 mm in the light emitting apparatus 100 according to the present embodiment. FIG. 14 shows a luminance distribution according to the related art example 1. FIG. 15 shows a luminance distribution according to the related art example 2. FIG. 16 shows a luminance distribution according to the related art example 3.

With reference to the simulation result shown in FIG. 13, it can be seen that a variation in luminance is small similarly as in the simulation result of FIG. 12. In other words, it can be seen that no large difference in the variation in luminance is present between when the LED 22 is at the normal position and when the LED 22 is backward offset by 0.5 mm in the light emitting apparatus 100 according to the present embodiment.

On the other hand, it can be seen that a variation in luminance in the simulation results shown in FIGS. 14 to 16 is larger than in the simulation results shown in FIGS. 12 and 13. In other words, it can be seen that a large variation in luminance occurs in the light emitting apparatus 16 in related art when the LED 22 is backward offset from the normal position by 0.5 mm.

As described above, the light emitting apparatus 100 according to the present embodiment is utilized so that the variation in luminance can be further restricted than when the light emitting apparatus 16 in related art is utilized even if a positional offset of the LED 22 occurs.

<5. Conclusions>

There has been described above the light emitting apparatus 100 according to the present embodiment. As stated above, in the light emitting apparatus 100 according to the present embodiment, the irregularity 150 formed at the light incident face 138 of the light guide plate 124 is formed with the first slope 152 having a predetermined angle θa and the second slope 154 having a predetermined angle θb. The θa of the first slope 152 is set at an angle such that the lights refracted at the first slope 152 and incident into the light guide plate 124 among the lights exited from the center of the LED 22 are fully reflected on the light exit face 140 of the light guide plate 124. Specifically, the angle θa of the first slope 152 is set in the above equation (1). The angle θb of the second slope 154 is set at an angle such that some lights exited from the center of the LED 22 are prevented from being directly refracted at the second slope 154 and incident into the light guide plate 124. Specifically, the minimum angle θb of the second slope 154 is set in the above equation (3). The angle θb of the second slope 154 is set at such an angle as to reduce the lights refracted at the first slope 152 and then incident into the light guide plate 124 to be fully reflected on the second slope 154 among the lights exited from the center of the LED 22. Specifically, the maximum angle θb of the second slope 154 is set in the above equation (2). The first slope 152 and the second slope 154 formed in the above manner are provided so that the light emitting apparatus 100 according to the present embodiment can restrict the variation in luminance from becoming larger even when the LED 22 is backward offset from the normal position.

It should be understood by those skilled in the art that various modifications, combinations, sub-combinations and alterations may occur depending on design requirements and other factors insofar as they are within the scope of the appended claims or the equivalents thereof.

For example, the configurations of the image displaying apparatus 200 and the light emitting apparatus 100 described in the above embodiment are exemplary for explaining the characteristics of the above embodiment and the present invention is not limited to the examples. For example, the light emitting apparatus 100 may be additionally provided with a reflection plate and the like in order to enhance the use efficiency of the lights exited from the LED 22 and the components of the image displaying apparatus 200 and the light emitting apparatus 100 may be appropriately changed depending on a requested specification, cost and the like.

The above simulation results are exemplary for describing the effects based on the above embodiment and the positional offset of the LED 22 allowable in the light emitting apparatus 100 according to the above embodiment is not limited to 0.5 mm. In other words, since the above angle θ1 changes depending on the amount of positional offset of the LED 22, a predetermined maximum offset position can be assumed based on an expected component-level tolerance or temporal change to form the first slope 152 and the second slope 154 based on the assumed offset position of the LED 22. Thus, the variation in luminance can be restricted even when the position of the LED 22 is offset by the assumed amount.

The present application contains subject matter related to that disclosed in Japanese Priority Patent Application JP 2009-14623 filed in the Japan Patent Office on Jan. 26, 2009, the entire content of which is hereby incorporated by reference.

What is claimed is:

1. A light emitting apparatus comprising:
a plurality of light sources for emitting a light; and
a light guide plate having a substantially plate shape orthogonal to the optical axis direction of the light source, which includes a light incident face into which a light exited from the light source is incident and a light exit face from which the light incident from the light incident face is exited,
wherein irregularities each made of a first slope forming an angle θa with the plane of the light incident face and a second slope forming an angle θb with the plane of the light incident face are continuously formed on the light incident face,
the angle θa is an angle for fully reflecting lights refracted at the first slope and incident into the light guide plate among the lights exited from the light source on the light exit face even when the position of the light source is offset to be distant from the light guide plate, and
the angle θb is an angle for preventing the light exited from the light source from being directly refracted at the second slope and incident into the light guide plate even when the position of the light source is offset to be distant from the light guide plate.

2. The light emitting apparatus according to claim 1, wherein the angles θa and θb are determined in the following equations (1) and (2) based on an angle θ1 between a line connecting the center of the light source and the first slope or the second slope, and the optical axis direction of the light source, an angle θc between the light exit face of the light guide plate and the plane of the light guide plate, and a refractive index n of the light guide plate:

[Formula 6]

$$\theta_a \geq \tan^{-1}\left[\frac{n \cdot \sin\left\{\sin^{-1}\left(\frac{1}{n}\right) - \theta_c\right\} - \sin\theta_1}{n \cdot \cos\left\{\sin^{-1}\left(\frac{1}{n}\right) - \theta_c\right\} - \cos\theta_1}\right] \quad \text{Equation (1)}$$

$$\theta_b \geq \frac{\pi}{2} - \theta_1 \quad \text{Equation (2)}$$

3. The light emitting apparatus according to claim 2, wherein the angle θb is determined in the following equation (3) for reducing the absolute amount of lights refracted at the first slope and then incident into the light guide plate to be fully reflected on the second slope even when the position of the light source is offset to be distant from the light guide plate:

[Formula 7]

$$\theta_b \leq \frac{\pi - \left[\theta_a + \sin^{-1}\left\{\frac{\sin(\theta_1 - \theta_a)}{n}\right\}\right] - \left\{\sin^{-1}\left(\frac{\sin\theta_c}{n}\right) - \theta_c\right\}}{2}$$

Equation (3)

4. The light emitting apparatus according to claim 3, wherein the light incident face of the light guide plate is provided with a concave into which a light exited from the light source is refracted at the light guide plate and then incident when the position of the light source is not offset, and the irregularities are continuously formed on an outer periphery of the concave.

5. The light emitting apparatus according to claim 1, wherein the first slope and the second slope are a curved face having a predetermined curvature.

6. An image displaying apparatus comprising:
a display panel for displaying an image thereon; and
a light emitting apparatus for illuminating the display panel from its back face,
wherein the light emitting apparatus includes:
a plurality of light sources for emitting a light; and
a light guide plate having a substantially plate shape substantially orthogonal to the display panel, which includes a light incident face into which a light exited from the light source is incident and a light exit face from which the light incident from the light incident face is exited,
irregularities each made of a first slope forming an angle θa with the plane of the light incident face and a second slope forming an angle θb with the plane of the light incident face are continuously formed on the light incident face,
the angle θa is an angle for fully reflecting lights refracted at the first slope and incident into the light guide plate among the lights exited from the light source on the light exit face even when the position of the light source is offset to be distant from the light guide plate, and
the angle θb is an angle for preventing the light exited from the light source from being directly refracted at the second slope and incident into the light guide plate even when the position of the light source is offset to be distant from the light guide plate.

* * * * *